US012705686B2

(12) United States Patent
Park et al.

(10) Patent No.: US 12,705,686 B2
(45) Date of Patent: Aug. 11, 2026

(54) IMAGE PROCESSING DEVICE AND METHOD THAT CAPTURES THE SURROUNDINGS OF A VEHICLE

(71) Applicant: THINKWARE CORPORATION, Seongnam-si (KR)

(72) Inventors: Soon Woo Park, Seongnam-si (KR); Hyun Chul Cho, Seongnam-si (KR)

(73) Assignee: Thinkware Corporation, Seongnam-si (KR)

( * ) Notice: Subject to any disclaimer, the term of this patent is extended or adjusted under 35 U.S.C. 154(b) by 0 days.

(21) Appl. No.: 18/961,985

(22) Filed: Nov. 27, 2024

(65) Prior Publication Data

US 2026/0038082 A1 Feb. 5, 2026

(30) Foreign Application Priority Data

Nov. 27, 2023 (KR) ........................ 10-2023-0166879
Nov. 27, 2024 (KR) ........................ 10-2024-0172212

(51) Int. Cl.

| | |
|---|---|
| ***G06T 3/073*** | (2024.01) |
| ***B60R 1/12*** | (2006.01) |
| ***B60R 1/27*** | (2022.01) |
| ***H04N 23/00*** | (2023.01) |
| ***H04N 23/90*** | (2023.01) |

(52) U.S. Cl.
CPC ................ *G06T 3/073* (2024.01); *B60R 1/12* (2013.01); *B60R 1/27* (2022.01); *H04N 23/90* (2023.01); *B60R 2001/1253* (2013.01); *B60R 2300/105* (2013.01); *B60R 2300/303* (2013.01)

(58) Field of Classification Search
CPC .. G06T 3/073; B60R 1/27; B60R 1/12; B60R 2001/1253; B60R 2300/105; B60R 2300/303; B60R 2300/202; B60R 2300/30; B60R 2300/306; H04N 23/90
See application file for complete search history.

(56) References Cited

U.S. PATENT DOCUMENTS

| | | | | |
|---|---|---|---|---|
| 7,542,034 | B2 * | 6/2009 | Spooner | G06T 15/20 382/154 |
| 10,442,355 | B2 * | 10/2019 | Scholl | B60R 1/27 |
| 10,699,389 | B2 * | 6/2020 | Van der Auwera | G06T 3/18 |
| 10,864,860 | B2 * | 12/2020 | Li | G06T 3/4038 |
| 11,958,414 | B2 * | 4/2024 | Blank | B60R 1/12 |

(Continued)

*Primary Examiner* — Brian P Yenke
(74) *Attorney, Agent, or Firm* — SALIWANCHIK, LLOYD & EISENSCHENK

(57) ABSTRACT

An image processing device for capturing surroundings of a vehicle includes a camera module that is installed in the vehicle and includes a plurality of cameras equipped with wide-angle lenses, an electronic device that processes an image acquired through the camera module, in which the electronic device includes: a communication circuit, an image input unit that receive captured vehicle surrounding images through the communication circuit, an image conversion unit that correct the vehicle surrounding images received by the image input unit, and a control unit that controls the communication circuit, the image input unit, and the image conversion unit, and the image conversion unit may be controlled through the control unit so that an overview screen in a circularly curved shape captured by the camera module is corrected into a flat image.

17 Claims, 13 Drawing Sheets

(56) References Cited

U.S. PATENT DOCUMENTS

2007/0211955 A1* 9/2007 Pan ...................... H04N 23/698 382/254
2009/0079553 A1* 3/2009 Yanagi ...................... B60R 1/26 348/148
2009/0102921 A1* 4/2009 Ito .......................... H04N 7/181 348/148
2010/0091110 A1* 4/2010 Hildreth .................. G06F 3/011 348/169
2011/0234801 A1* 9/2011 Yamada ................. H04N 23/90 348/148
2012/0086807 A1* 4/2012 Simon ...................... G06T 5/80 348/148
2012/0262580 A1* 10/2012 Huebner ................ G08G 1/167 348/148
2014/0055487 A1* 2/2014 Kiyo ....................... G06T 11/60 345/629
2014/0104424 A1* 4/2014 Zhang ..................... G06T 3/047 348/148
2014/0111637 A1* 4/2014 Zhang ..................... B60R 1/088 348/118
2014/0114534 A1* 4/2014 Zhang .................... H04N 23/81 701/42
2015/0178884 A1* 6/2015 Scholl ...................... G06T 7/33 382/104
2016/0368417 A1* 12/2016 Bassi ..................... H04N 23/13
2017/0101058 A1* 4/2017 Park ........................ B60R 1/081
2017/0174133 A1* 6/2017 Kumon ..................... B60R 1/26
2017/0345136 A1* 11/2017 Van der Auwera ....... G06T 3/08
2019/0082157 A1* 3/2019 Pflug .................... H04N 13/106
2019/0092392 A1* 3/2019 Schut ................. B62D 15/0275
2019/0174060 A1* 6/2019 Oba ....................... H04N 23/90
2019/0349571 A1* 11/2019 Herman ............... H04N 23/698
2020/0257918 A1* 8/2020 Liu ........................ G06V 10/25
2021/0027522 A1* 1/2021 Dabral ................. H04N 13/111
2022/0078390 A1* 3/2022 Jingu ...................... G06T 15/20
2022/0141364 A1* 5/2022 Rajhansa ............... H04N 23/69 348/39
2022/0153194 A1* 5/2022 Karas ..................... G08G 1/168
2022/0203895 A1* 6/2022 Moriyama .............. B60R 1/002
2023/0099481 A1* 3/2023 Yuda ...................... G08G 1/167 348/148
2023/0415652 A1* 12/2023 Wada ..................... H04N 23/90
2024/0338923 A1* 10/2024 Chaurasia .............. G06V 10/25
2024/0343193 A1* 10/2024 Choi ......................... B60R 1/22
2025/0091513 A1* 3/2025 Lee ........................... B60R 1/28
2025/0100451 A1* 3/2025 Cho .......................... B60R 1/26
2025/0289370 A1* 9/2025 Badki ..................... G06T 17/00

* cited by examiner 20
240
250
260
IMAGE CONVERSION UNIT
MEMORY
SENSOR UNIT
205
CONTROL UNIT
IMAGE INPUT UNIT
COMMUNICATION CIRCUIT
230
220
210
110
120
130
140
10
CAMERA MODULE
FIRST CAMERA
SECOND CAMERA
THIRD CAMERA
FOURTH CAMERA

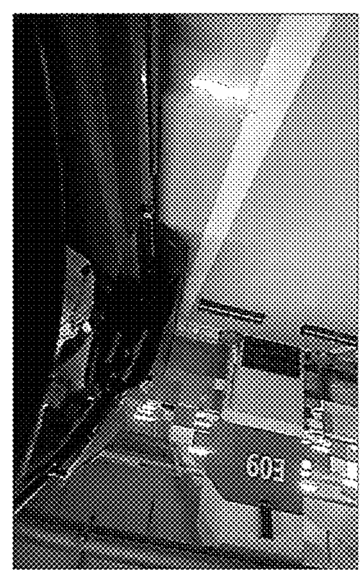
FIG. 4C
FIG. 4B
FIG. 4A
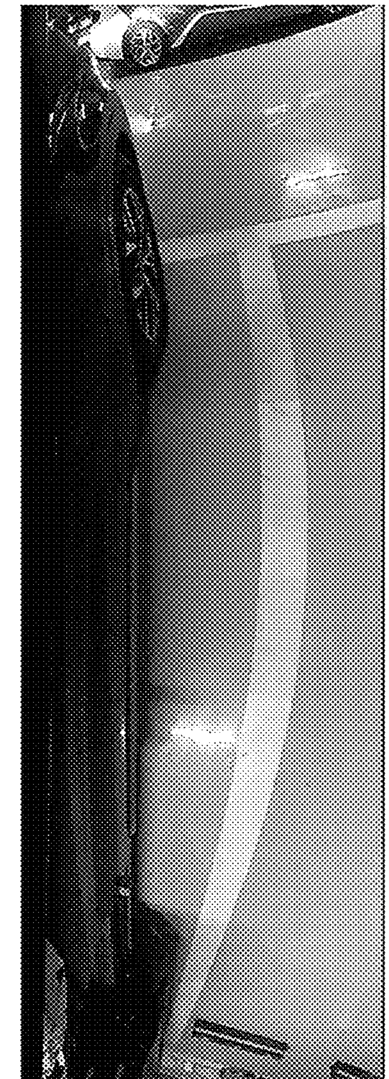
FIG. 4D
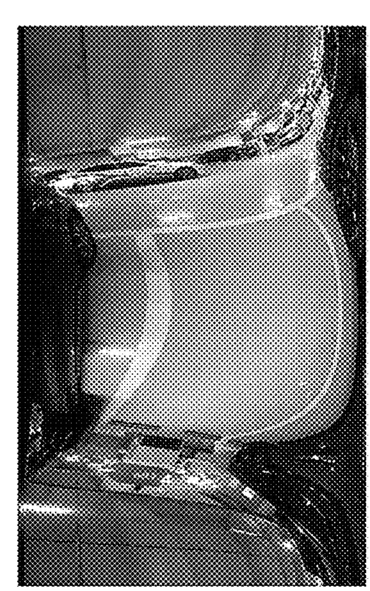
FIG. 4E (b-2)
(b-1)
(a-2)
(a-1)
(e)
(d)
(f)
(c)
(a)
(b)

FIG. 11

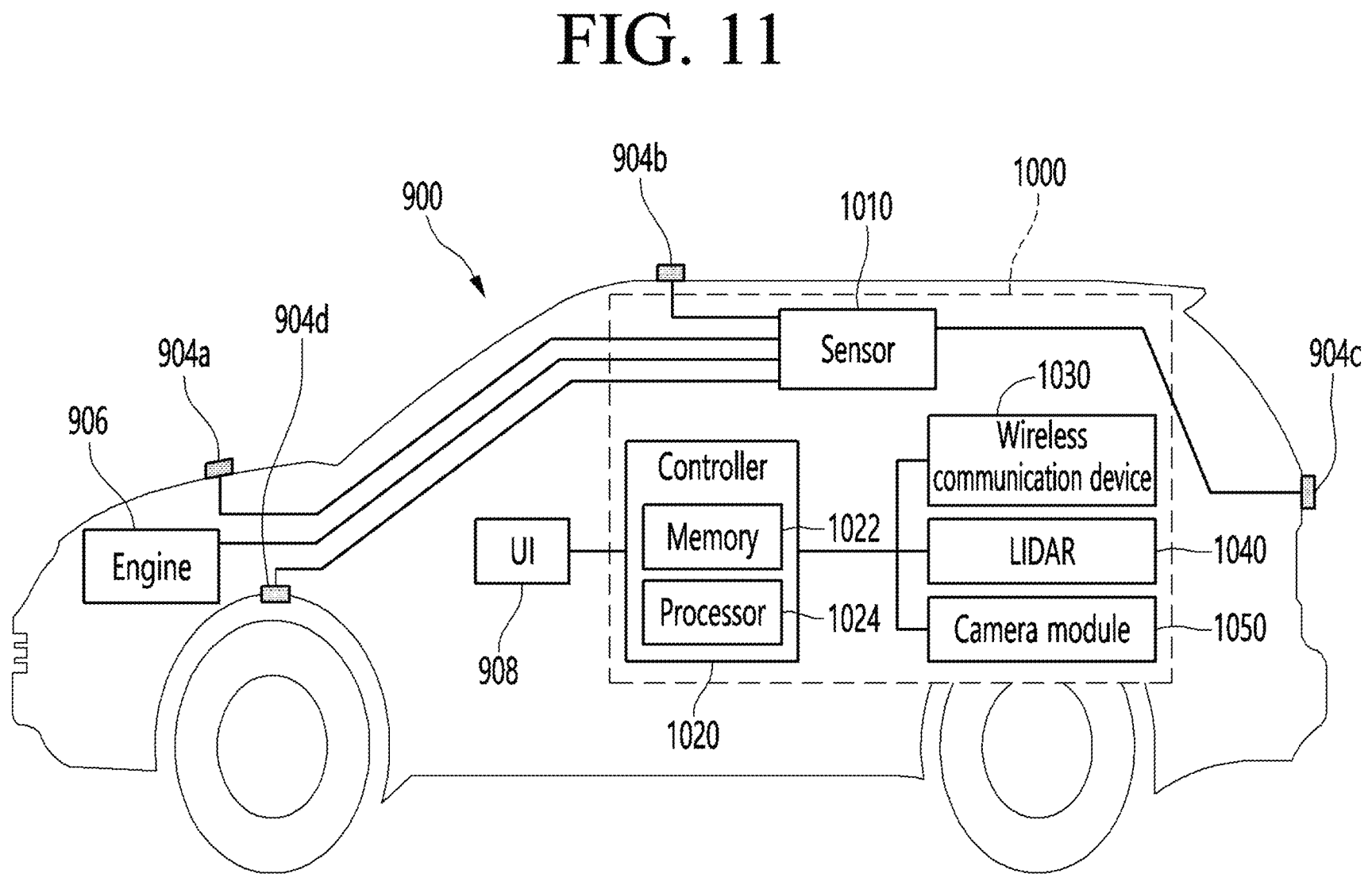

904c
1040
1050
1000
1030
Wireless communication device
LIDAR
Camera module
1010
Sensor
1022
1024
Controller
Memory
Processor
904b
1020
UI
908
900
904d
904a
Engine
906

FIG. 13

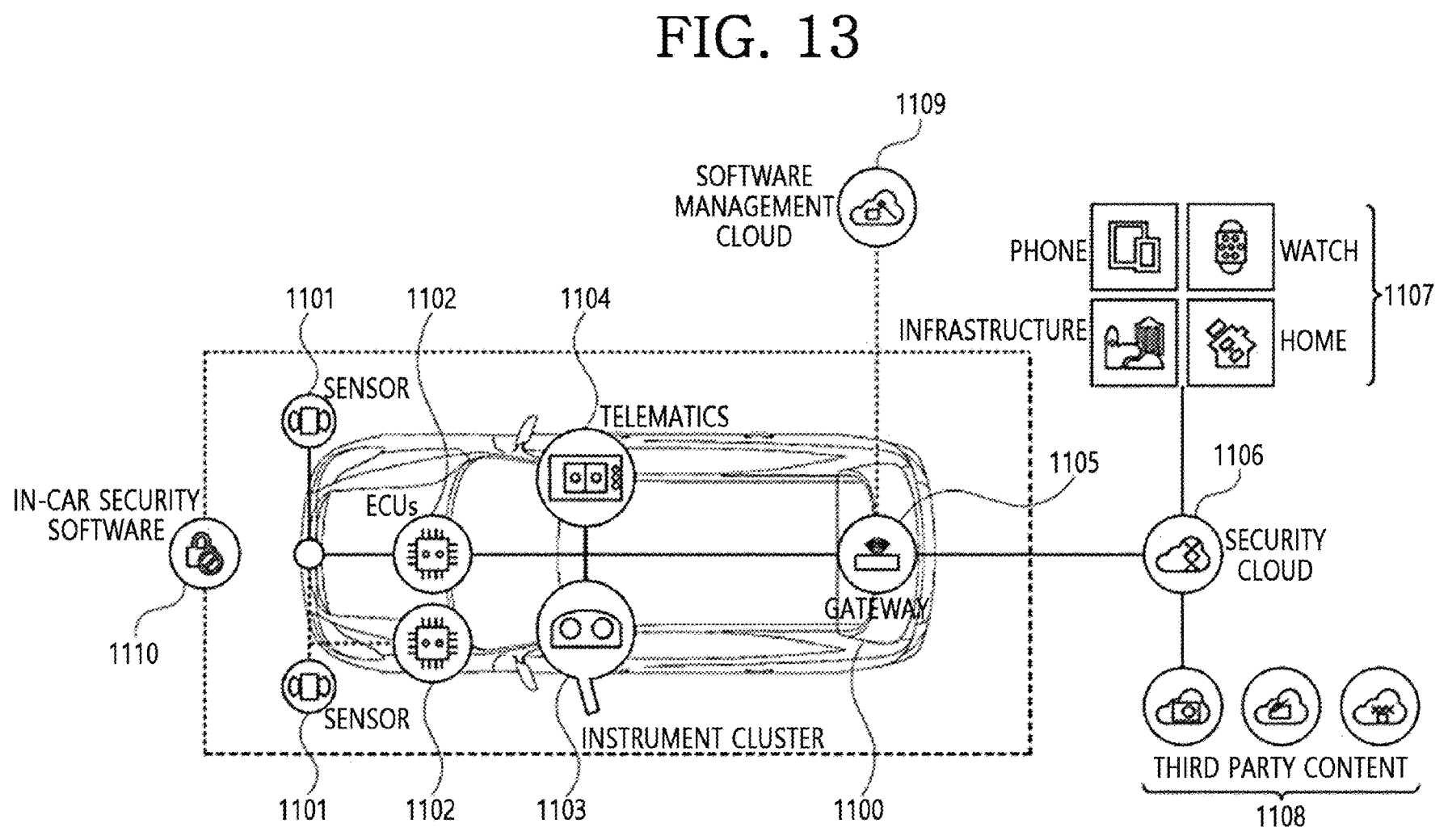

SOFTWARE MANAGEMENT CLOUD
1109
PHONE
WATCH
INFRASTRUCTURE
HOME
1107
1105
1106
SECURITY CLOUD
THIRD PARTY CONTENT
1108
GATEWAY
1100
TELEMATICS
1104
INSTRUMENT CLUSTER
1103
ECUs
1102
1102
SENSOR
1101
SENSOR
1101
IN-CAR SECURITY SOFTWARE
1110

IMAGE PROCESSING DEVICE AND METHOD THAT CAPTURES THE SURROUNDINGS OF A VEHICLE

CROSS-REFERENCE TO RELATED APPLICATIONS

This application claims the benefit of Korean Application Nos. 10-2024-0172212, filed Nov. 27, 2024; and 10-2023-0166879, filed Nov. 27, 2023, the disclosure of each of which is incorporated by reference herein in its entirety.

TECHNICAL FIELD

The present disclosure relates to an image processing device and method for capturing surroundings of a vehicle, and more particularly, to an image processing device and method for capturing surroundings of a vehicle capable of correcting vehicle surrounding images in a circularly curved shape, captured by a wide-angle lens mounted on a side mirror of the vehicle, to a flat image and outputting the flat image.

TECHNOLOGY BACKGROUND OF THE INVENTION

Side view mirrors disposed on the left and right sides of a vehicle are configured as mirrors to change lanes or check surrounding situations such as surrounding vehicles and pedestrians.

However, the side view mirrors of the vehicle have a disadvantage in that blind spots occur due to a narrow angle of view.

In order to improve the disadvantage, a function of a digital side mirror (DSM) that omits the side mirrors disposed on existing vehicles and replaces the side mirrors with a camera and a display is being developed.

The digital side mirror (DSM) has cameras installed on the left and right sides of the vehicle instead of the side mirrors, and images captured by the cameras can be confirmed through the display installed inside the vehicle, thereby obtaining a clear and wide-angle rear view.

However, since the digital side mirror (DSM) provides a rear view using the camera and monitor, there is no way to secure the rear view when a system error occurs.

Therefore, various technologies that may conveniently confirm the blind spots of the side mirror of the vehicle are being developed recently.

CONTENTS OF THE INVENTION

Problems to be Solved

The present disclosure provides an image processing device and method for capturing surroundings of a vehicle capable of replacing a function performed by multiple cameras by capturing the surroundings of the vehicle using a camera equipped with a wide-angle lens having a wide angle of view.

The present disclosure provides an image processing device and method for capturing surroundings of a vehicle capable of outputting a flat image by correcting an overview screen in a circularly curved shape so that a state of the surroundings of the vehicle may be easily confirmed.

The present disclosure provides an image processing device and method for capturing surroundings of a vehicle using a wide-angle lens capable of outputting an area suitable for a driving mode by dividing and correcting images of the surroundings of the vehicle by area.

The present disclosure provides an image processing device and method for capturing surroundings of a vehicle capable of increasing a surveillance function by confirming the state of the surroundings of the vehicle using a camera equipped with a wide-angle lens having a wide angle of view.

Means for Solving the Problem

According to an aspect of the present disclosure, an image processing device for capturing surroundings of a vehicle includes: a camera module that is installed in the vehicle and includes a plurality of cameras equipped with wide-angle lenses; an electronic device that processes an image acquired through the camera module, in which the electronic device includes: a communication circuit; an image input unit that receives captured vehicle surrounding images through the communication circuit; an image conversion unit that corrects the vehicle surrounding images received by the image input unit; and a control unit that controls the communication circuit, the image input unit, and the image conversion unit, and the image conversion unit is controlled through the control unit so that an overview screen in a circularly curved shape captured by the camera module is corrected into a flat image.

The camera module may include: a first camera that is installed on a left side mirror of the vehicle; a second camera that is installed on a right side mirror of the vehicle; a third camera that captures a front area of the vehicle; and a fourth camera that captures a rear area of the vehicle.

The image conversion unit may be controlled by the control unit to divide the received vehicle surrounding images into a plurality of images according to a captured area of the vehicle.

The vehicle surrounding images may be divided into a front area, a rear area, a left side area, and a right side area of the vehicle based on mounting points of the wide-angle lenses installed on the side mirrors of the vehicle, and the left side area and the right side area may further be divided into top and bottom areas, respectively.

The image conversion unit may be controlled to correct some of the plurality of divided vehicle surrounding images to the flat image.

The image conversion unit may be controlled to selectively merge some of the plurality of divided vehicle surrounding images and correct the merged vehicle surrounding images to a single flat image.

The image processing device may further include a sensor unit that detects internal and external environments of the vehicle, in which the sensor unit may be controlled by the control unit to detect a driving mode of the vehicle.

The driving mode may include a forward mode, a backward mode, a left turn mode, and a right turn mode.

The image conversion unit may be controlled to selectively merge some of the vehicle surrounding images divided into the plurality of images according to the driving mode of the vehicle and correct the merged vehicle surrounding images to the single flat image.

When the driving mode is the forward mode, the image conversion unit may be controlled by the control unit to merge the vehicle surrounding images captured by each of the first camera, the second camera, and the fourth camera and correct the merged vehicle surrounding images to the single flat image.

When the driving mode is the backward mode, the image conversion unit may be controlled to merge the vehicle surrounding images captured by each of the first camera, the second camera, and the fourth camera and correct the merged vehicle surrounding images to the single flat image, but the left side area and the right side area may each be controlled to be extracted only from the bottom area and merge the vehicle surrounding images.

When the driving mode is the left turn mode, the image conversion unit may be controlled to correct the vehicle surrounding images captured by the first camera to the single flat image.

When the driving mode is the right turn mode, the image conversion unit may be controlled to correct the vehicle surrounding images captured by the second camera to the single flat image.

An image processing method of capturing surroundings of a vehicle includes: detecting a driving mode of the vehicle; capturing the surroundings of the vehicle using a camera module equipped with a wide-angle lens; receiving the captured vehicle surrounding images; correcting the received vehicle surrounding images; and outputting the corrected vehicle surrounding images, in which the corrected vehicle surrounding images are a video or an image in which an overview screen in a circularly curved shape is corrected to a flat image.

The camera module may include a first camera, a second camera, a third camera, and a fourth camera that are installed on left and right side mirrors of the vehicle, respectively, and the captured vehicle surrounding images may include images captured by the first camera, the second camera, the third camera, and the fourth camera, respectively.

In the correcting, after the received vehicle surrounding images are divided into a plurality of images according to the driving mode of the vehicle, some of the plurality of divided vehicle surrounding images may be controlled to be selectively merged and corrected to a single flat image.

When the driving mode is a forward mode, in the correcting, the vehicle surrounding images captured by each of the first camera, the second camera, and the fourth camera may be controlled to be merged and corrected to a single flat image.

When the driving mode is a backward mode, in the correcting, the vehicle surrounding images captured by the first camera, the second camera, and the fourth camera, respectively, may be merged and corrected to a single flat image, but the images captured by the first and second cameras may be merged by selectively extracting only a bottom area.

Meanwhile, a computer-readable recording medium may record a program for executing the image processing method for capturing surroundings of a vehicle according to an embodiment of the present disclosure for achieving the above-described object.

In addition, a computer program according to an embodiment of the present disclosure for achieving the above-described object may include a program code for executing the image processing method for capturing surroundings of a vehicle.

Effects of the Invention

According to the image processing device and method for capturing surroundings of a vehicle according to exemplary embodiments of the present disclosure, it is possible to obtain the economic effects by reducing the number of cameras and reducing the weight and cost by replacing the functions performed by multiple cameras by capturing the surroundings of the vehicle using the camera equipped with the wide-angle lens.

According to the image processing device and method for capturing surroundings of a vehicle according to exemplary embodiments of the present disclosure, it is possible to easily confirm the conditions of the surroundings of the vehicle by correcting the overview screen of the circularly curved shape, captured by the wide-angle lens, into the flat image and outputting the flat image.

According to the image processing device and method for capturing surroundings of a vehicle according to exemplary embodiments of the present disclosure, it is possible to increase the convenience by dividing the captured image by area and correcting the captured image so that the area suitable for the driving mode is output.

According to the image processing device and method for capturing surroundings of a vehicle according to exemplary embodiments of the present disclosure, it is possible to confirm the conditions of the surroundings of the vehicle using the wide angle of view of 360°, so that no blind spots occur, thereby increasing the surveillance function.

BRIEF DESCRIPTION OF DRAWINGS

FIGS. 3A-3E and 4A-4E are diagrams illustrating converting the captured image into the flat image using the wide-angle lens according to exemplary embodiments of the present disclosure.

FIGS. 11 and 12 are diagrams illustrating an example of a block diagram illustrating an autonomous driving moving body according to exemplary embodiments of the present disclosure.

FIG. 13 is a diagram illustrating an example of a gateway associated with a user device according to exemplary embodiments of the present disclosure.

DETAILED DESCRIPTION

Hereinafter, detailed embodiments of the present disclosure will be described. The following detailed descriptions are provided to help a comprehensive understanding of methods, devices and/or systems described herein. However, embodiments are described by way of examples only and the present disclosure is not limited thereto.

In describing exemplary embodiments of the present disclosure, when it is decided that a detailed description of a well-known technology related to the present disclosure may unnecessarily obscure the gist of the present disclosure, the detailed description will be omitted. Further, the following terminologies are defined in consideration of the functions in the present disclosure and may be construed in different ways by the intention of users and operators. Therefore, the definitions thereof should be construed based on the contents throughout the specification. The terms used in the detailed description is merely for describing the embodiments of the present disclosure and should in no way be limited. Unless explicitly used otherwise, expressions in a singular form include the meaning in a plural form. In the present description, expressions such as “include” or “comprise” are used to refer to certain features, numbers, steps, operations, components, or some or a combination thereof, and should not be construed to preclude the presence or addition of one or more other features, numerals, steps, operations, components other than those described, or some or a combination thereof.

In addition, terms ‘first’, ‘second’, A, B, (a), (b), and the like, will be used in describing components of exemplary embodiments of the present disclosure. These terms are used only to differentiate the components from other components. Therefore, the nature, times, sequence, etc., of the corresponding components are not limited by these terms.

Figure 1:
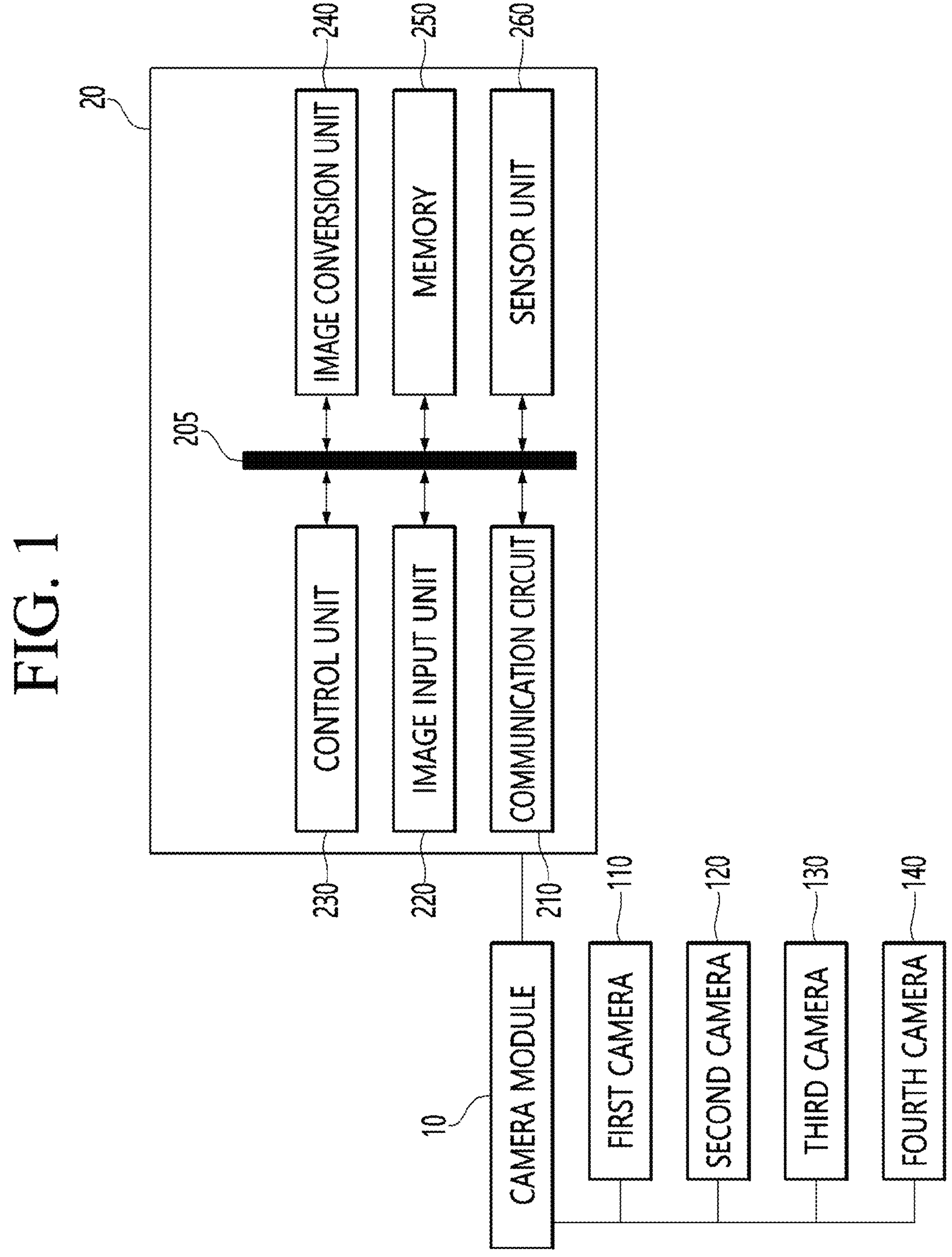
FIG. 1 is a block diagram illustrating an image processing device for capturing surroundings of a vehicle using a wide-angle lens according to exemplary embodiments of the present disclosure.

FIG. 1 is a block diagram illustrating an image processing device 1 for capturing surroundings of a vehicle according to exemplary embodiments of the present disclosure.

Referring to FIG. 1, the image processing device 1 for capturing surroundings of a vehicle may include a camera module 10 and an electronic device 20. The image processing device 1 may be mounted on a vehicle. In some embodiments, at least one other component may be added to the image processing device 10.

The camera module 10 may include first and second cameras 110 and 120 equipped with wide-angle lenses, a third camera 130 for capturing a front area of the vehicle, and a fourth camera 140 for capturing a rear area of the vehicle.

The first camera 110 and the second camera 120 may acquire a wide angle of view by using an ultra-wide angle lens such as a fish-eye lens. The first camera 110 is installed on a left side mirror of the vehicle and may capture the entire left side using an angle of view of about 180°, and the second camera 120 may be installed on the right side mirror of the vehicle and may capture the entire right side using an angle of view of about 180°. The first camera 110 and the second camera 120 may capture the entire 180° area in front of a capturing direction depending on the attached location.

The third camera 130 may be a front camera that captures the front area of the vehicle, and the fourth camera 140 may be a rear camera that captures the rear area of the vehicle. The third camera 130 may capture the front of the vehicle using an angle of view of about 180°, and the fourth camera 140 may capture the rear of the vehicle using an angle of view of about 180°. However, it is not limited thereto, and the angles of view of the third camera 130 and the fourth camera 140 may be narrower than the angles of view of the first camera 110 and the second camera 120.

The camera module 10 may include at least one of one or more lenses, an image sensor, a flash, and an image signal processor (ISP). Some of the lenses may have the same lens properties (e.g., angle of view, focal length, auto focus, f number, or optical zoom). The lenses may include a light source lens or a telephoto lens. The image sensor may acquire an image corresponding to a subject by converting light emitted or reflected from the subject and transmitted through one or more lenses into an electrical signal. For example, the image sensor may include one image sensor selected from among image sensors with different properties, such as an RGB sensor, a black and white (BW) sensor, an IF sensor, or a UV sensor, a plurality of image sensors having the same property, or a plurality of image sensors having different properties. Each image sensor may be implemented using, for example, a charged coupled device (CCD) sensor or a complementary metal oxide semiconductor (CMOS) sensor. The flash may include one or more light-emitting diodes (e.g., a red-green-blue (RGB) LED, a white LED, an infrared LED, or an ultraviolet LED), or a xenon lamp.

The electronic device 20 may perform image processing based on an image acquired by the camera module 10.

The electronic device 20 may include a communication circuit 210, an image input unit 220, a control unit 230, an image conversion unit 240, a memory 250, and a sensor unit 260.

Referring to FIG. 1, the communication circuit 210, the image input unit 220, the control unit 230, and the image conversion unit 240 may be electrically and/or operatively connected to each other by electronic components and/or electrical components such as a communication bus 205. Hereinafter, operatively coupling the electronic components may mean that a direct connection or an indirect connection is established between the first electronic components and the second electronic components in either a wired or wireless manner, such that the second electronic component is controlled by the first electronic component. Although illustrated based on different blocks, the embodiment is not limited thereto, and some (e.g., at least a portion of the control unit 230 and the image conversion unit 240) of the electronic components of FIG. 1 may be included in a single integrated circuit such as a system on a chip (SoC). The type and/or number of electronic components included in the electronic device 20 is not limited to that illustrated in FIG. 1. For example, the electronic device 20 may include only some of the electronic components illustrated in FIG. 1.

The communication circuit 210 of the electronic device 20 may receive images of the surroundings of the vehicle captured by the first and second cameras 110 and 120, the third camera 130, and the fourth camera 140. Here, the camera module 10 and the electronic device 20 may be connected to each other in a wired or wireless manner. For example, the camera module 10 and the electronic device 20 may be connected via a communication cable. For example, the camera module 10 and the electronic device 20 may communicate in an analog manner. The analog manner may include, for example, analogue high definition (AHD). For example, the camera module 10 and the electronic device 20 may communicate in a digital manner. The digital manner may include a serial transmission manner. In this case, the camera module 10 may include a serializer, and the electronic device 20 may include a deserializer. For example, the camera module 10 and the electronic device 20 may be connected via internal network communication (e.g., CAN communication) of the vehicle. For example, the camera module 10 and the electronic device 20 may include various communication chips.

The image input unit 220 of the electronic device 20 may receive images received from the first to fourth cameras 110, 120, 130, and 140 via the communication circuit 210. The image input unit 220 may receive an overview image in a circularly curved shape from the first and second cameras 110 and 120, and may receive an image including a flat image from the third camera 130 and the fourth camera 140. Of all the original images received by the image input unit 220 from the camera module 10, an image of an area that is not output to the display 40 to be described below may be stored in the memory 250 by the control unit 230. The image stored in the memory 250 may be output after being corrected by the image conversion unit 240 if needed.

The control unit 230 may include a circuit for processing data (e.g., a processing circuit). A circuit for processing data may include, for example, an arithmetic and logic unit (ALU), a floating point unit (FPU), a field programmable gate array (FPGA), a central processing unit (CPU), a graphic processing unit (GPU), a neural processing unit (NPU), and/or an application processor (AP). For example, the number of control units 230 may be one or more. The processing circuit of the control unit 230 may be called or referred to as a core circuit (or core). For example, the control unit 230 may have a structure of a multi-core processor including a plurality of core circuits, such as a dual core, a quad core, a hexa core, or an octa core. The functions and/or operations described with reference to the present disclosure may be performed individually and/or collectively by one or more processing circuits included in a processor.

The image conversion unit 240 may be controlled by the control unit 230 to correct the overview screen in the circularly curved shape received from the first and second cameras 110 and 120 by the image input unit 220 into a flat image, and to synthesize the image corrected into the flat image with the flat image received from the third camera 130 and the fourth camera 140. The process of the image conversion unit 240 correcting the image will be described later.

The memory 250 may include a circuit for storing data input to or output from the control unit 230. The memory 250 may include, for example, a volatile memory such as a random-access memory (RAM) and/or a non-volatile memory such as a read-only memory (ROM). The non-volatile memory may be referred to as storage. The volatile memory may include, for example, at least one of a dynamic RAM (DRAM), a static RAM (SRAM), a cache RAM, and a pseudo SRAM (PSRAM). The nonvolatile memory may include, for example, at least one of a programmable ROM (PROM), an erasable PROM (EPROM), an electrically erasable PROM (EEPROM), a flash memory, a hard disk, a compact disk, a solid state drive (SSD), and an embedded multi media card (eMMC). The memory 250 may include one or more storage media (e.g., the volatile memory and/or nonvolatile memory described above) located in a distributed manner in the electronic device 20.

The sensor unit 260 may detect the internal environment and the external environment of the vehicle. Specifically, the sensor unit 260 may detect the internal environment including information such as vehicle gear change and vehicle moving direction, and the external environment including information such as speed and size of an object approaching from the outside of the vehicle. The sensor unit 260 may synthesize the internal and external environment information and transmit the driving mode, such as driving or parking of the vehicle, to the control unit 230.

Figure 2:
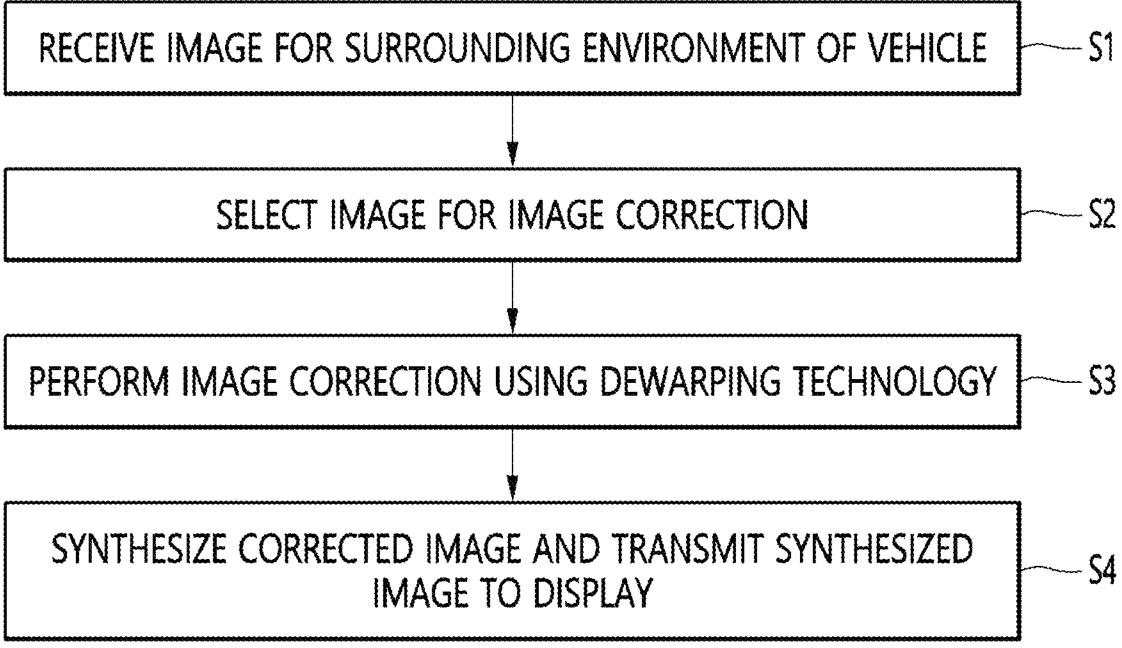
FIG. 2 is a flowchart illustrating an operation of an electronic device for converting a captured image into a flat image and/or video.

FIG. 2 is a flowchart illustrating an operation of the electronic device 20 for converting the captured image into the flat image and/or video.

Referring to FIG. 2, in operation S1, the electronic device 20 may receive images of the surrounding environment of the vehicle from the camera module 10 through the communication circuit 210. For example, the first camera 110 and the second camera 120 may be included in the vehicle and arranged toward the surrounding environment of the vehicle. For example, the surrounding environment may be described as an actual environment. For example, the surrounding environment may include a vehicle. For example, the surrounding environment may include external objects (e.g., pedestrians, etc.). For example, the first camera 110 and the second camera 120 may acquire the images of the surrounding environment. For example, the first camera 110 and the second camera 120 may acquire the images of the surrounding environment. The first camera 110 and the second camera 120 may transmit the acquired image and/or video to the image input unit 220.

In operation S2, the electronic device 20 may select an image and/or video for image and/or video correction received from the camera module 10. For example, the selected image for performing the image correction may be an image acquired through the first camera 110 and the second camera 120. The contents of the image correction are described in detail and exemplified with reference to FIGS. 3A-3E and 4A-4E.

FIGS. 3A-3E and 4A-4E are diagrams for describing that the image conversion unit according to exemplary embodiments of the present disclosure converts the captured image into the flat image using the wide-angle lens.

In operation S3 (see FIG. 2), the image conversion unit 240 may convert a hemispherical overview screen into the flat image using a dewarping technology. The dewarping technology may be composed of a process of distortion modeling, coordinate conversion, image reconstruction, and image output. First, the distortion characteristics generated by the wide-angle lens may be analyzed and mathematically modeled. Generally, the distortion is more severe at an edge of the image, so a lens distortion equation may be utilized to correct the distortion. Since each pixel of the image captured by the wide-angle lens is located at a distorted coordinate, it must be converted into a coordinate on a plane, and the position of each pixel may be converted into an orthogonal coordinate system on a plane using a spherical coordinate system. In this case, the positions of each pixel may be readjusted to remove the distortion, and color values for the empty pixels after the conversion may be estimated to generate a smooth image.

Referring to FIGS. 3A-3E and 4A-4E, FIGS. 3A and 4A are original images received by the image input unit 220. The original image captured by the wide-angle lens may be transferred as a hemispherically distorted image. The image conversion unit 240 may correct the distorted image into a plane by dividing the distorted image by area by utilizing the dewarping technology. FIGS. 3B, 3C, 3D and FIGS. 4B, 4C, 4D are images in which a side front surface, a side rear surface, and a side bottom surface of the original image received are converted into planes, respectively. The hemispherically distorted image captured by the wide-angle lens may be corrected into the flat image. Here, the corrected flat image may be transmitted to the display 40. A user (e.g., a driver) may confirm the images of the side front surface, side rear surface, and side bottom surface of each image through the display 40. However, the present disclosure is not limited thereto, and the images corrected into the planes may be transmitted to the display 40 by performing the synthesis operation.

Figure 3A:
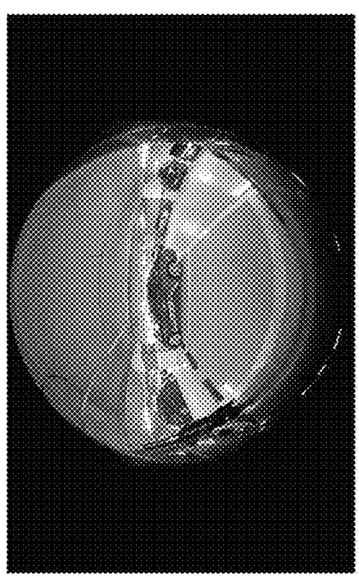
Figure 3B:
Figure 3C:
Figure 3D:
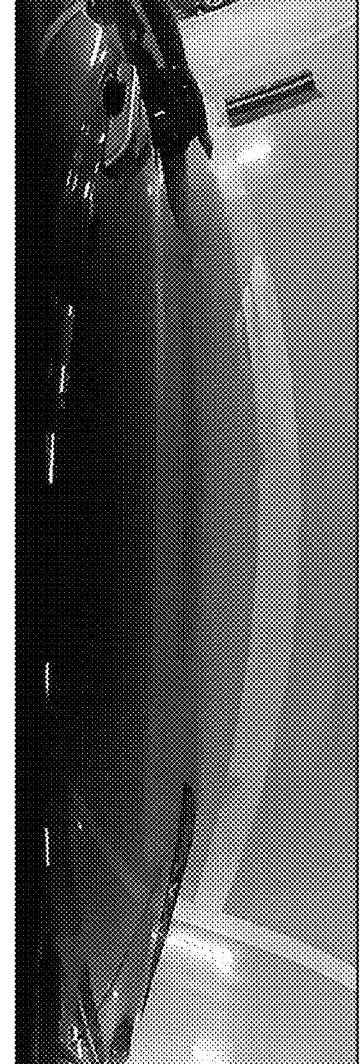
Figure 3E:
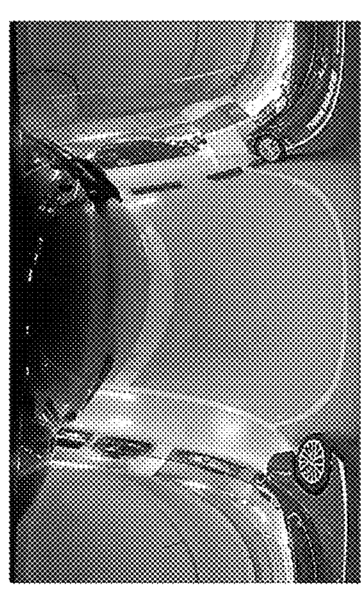

In operation S4, the images corrected into the planes may be synthesized into a single flat image as illustrated in FIGS. 3E and 4E. The synthesized flat image may be transmitted to the display 40. A screen may be displayed through the display 40. For example, the screen may include the images of the surroundings of the vehicle provided when the vehicle is driven or parked. For example, the screen may include content that warns the user (e.g., a driver) of a risk of collision. For example, the screen may include text indicating the risk.

Figure 5:
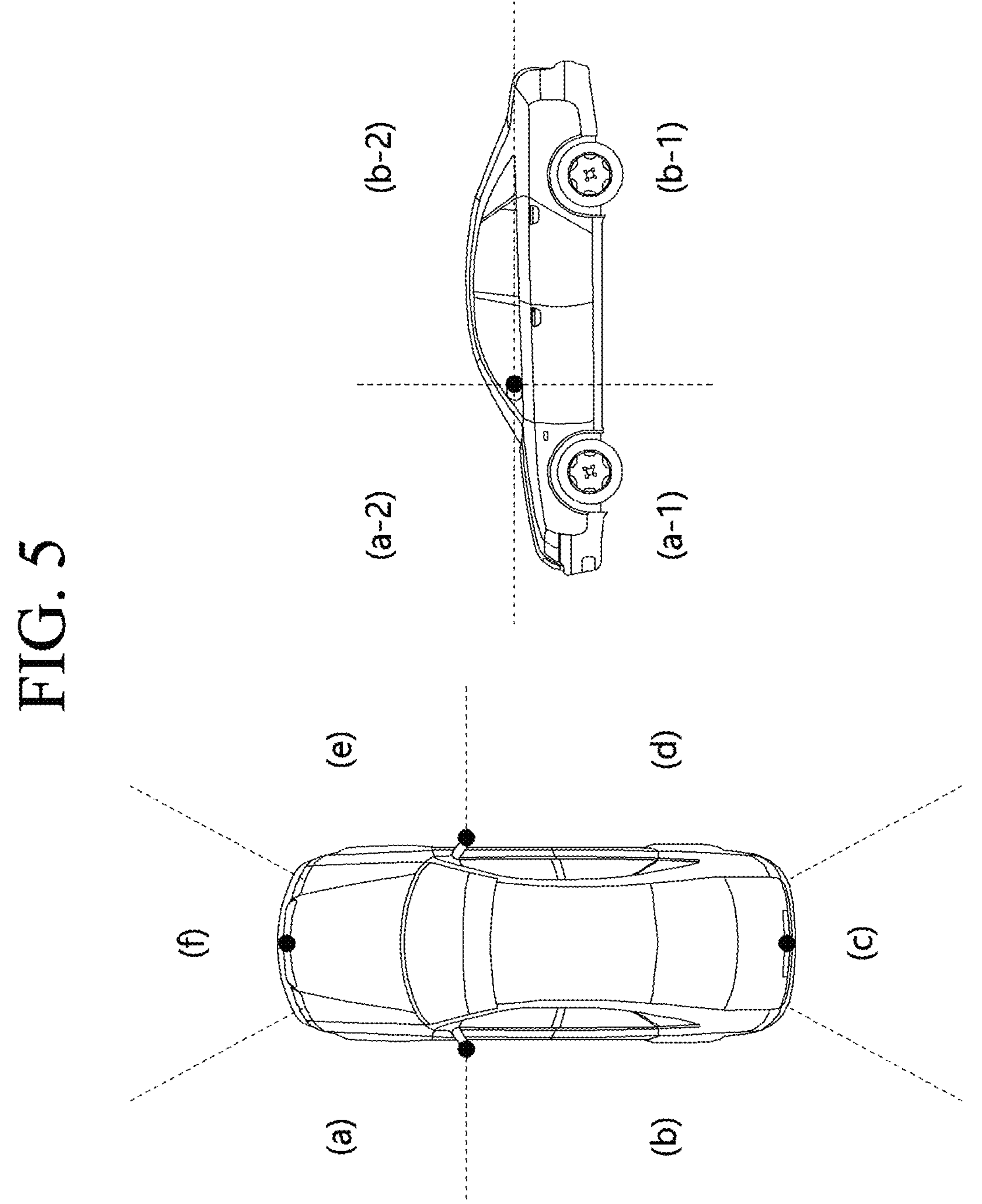
FIG. 5 is a diagram illustrating a mounting position of a camera module and an area division of a captured image according to exemplary embodiments of the present disclosure.

FIG. 5 is a diagram for describing the mounting position of the camera module 10 and the area division of the captured image according to exemplary embodiments of the present disclosure.

Referring to FIG. 5, the image conversion unit 240 may be controlled to divide vehicle surrounding images received by the image input unit 220 into a plurality of images according to the captured area of the vehicle. The surrounding images of the vehicle may be divided into the front, rear, left side, and right side areas of the vehicle based on two side mirrors of the vehicle on which the first and second cameras 110 and 120 including wide-angle lenses are mounted.

Specifically, the first camera 110 mounted on the left side mirror may capture the left side of the vehicle at an angle of view of about 180° (a and b areas), and the second camera 120 mounted on the right side mirror may capture the right side of the vehicle at an angle of view of about 180° (d and e areas). In addition, the front area (f area) may be captured by the third camera 130, and the rear area (c area) may be captured by the fourth camera 140.

In addition, the front area of the vehicle may include an area encompassing the front of the vehicle based on the points where the first and second cameras 110 and 120 are installed (a, f, and e areas), and the rear area of the vehicle may include an area (b, c, and d areas) encompassing the rear of the vehicle based on the points where the first and second cameras 110 and 120 are installed (b, c, and d areas). Accordingly, the left side and right side may be divided into a left front area (a area), a left rear area (b area), a right front area (e area), and a right rear area (d area) based on the first and second cameras 110 and 120.

In addition, the left side area and the right side area captured by the first and second cameras 110 and 120 may be further divided into a top area and a bottom area, respectively. Based on the side mirrors where the first and second cameras 110 and 120 are installed, the vertically upward area may be divided into a top area, and the vertically downward area may be divided into a bottom area.

In an embodiment, the left side area captured by the first camera 110 may be divided into a left front area (a area) and a left rear area (b area), and each of these may be further divided into upper and bottom areas, and divided into a left front top area (a-2 area), a left front bottom area (a-1 area), a left rear top area (b-2 area), and a left rear bottom area (b-1 area).

Similarly, although not illustrated in the drawing, the right side area captured by the second camera 120 may also be further divided into upper and bottom areas, and divided into a right front top area, a right front bottom area, a right rear top area, and a right rear bottom area.

Meanwhile, some of the plurality of divided vehicle surrounding images may be selected as images for video (image) correction, and the selected images may be subjected to image (distortion) correction using the dewarping technology, and then the corrected image and the flat image may be synthesized to be corrected into a single flat image.

In another embodiment, some of the plurality of divided vehicle surrounding images may be selectively merged to be corrected into a single flat image.

In an embodiment, when the images of the left rear area (b area), the rear area (c area), and the right rear area (d) of the vehicle are received, the images of the left rear area (b area) and the right rear area (d) of the vehicle that require correction as the flat image may be corrected as the flat image, and then the corrected image and the image of the rear area (c area) may be synthesized to be output as the flat image.

In another embodiment, the images of the left rear area (b area), the rear area (c area), and the right rear area (d area) of the vehicle may be selected, merged, and corrected to the flat image, so the image of the rear area of the vehicle may be output as one smooth image.

In another embodiment, when receiving the images of the left rear bottom area, rear bottom area, and right rear bottom area of the vehicle, the images of the left rear bottom area and the right bottom area of the vehicle that need to be corrected to the flat image may be corrected as the flat image, and then the corrected image and the image of the rear bottom area may be synthesized to be output as the flat image.

In another embodiment, when selecting and merging the images of the left rear bottom area, the rear bottom area, and the right rear bottom area of the vehicle and correcting the images to the flat image, the rear bottom area of the vehicle may be output.

In another embodiment, in order to confirm the blind spot of the front of the vehicle, when receiving the images of the left front bottom area, the front bottom area, and the right rear bottom area of the vehicle, the images of the left front bottom area and the right rear bottom area that need to be corrected to the flat image may be corrected to the flat image, and then the corrected images and the images of the front bottom area may be synthesized to be output as the flat image.

In another embodiment, in order to confirm the blind spot of the front area of the vehicle, the images of the left front bottom area, the front bottom area, and the right rear bottom area of the vehicle may be selected and merged and corrected to the flat image, so the front bottom area of the vehicle is output.

Figure 6:
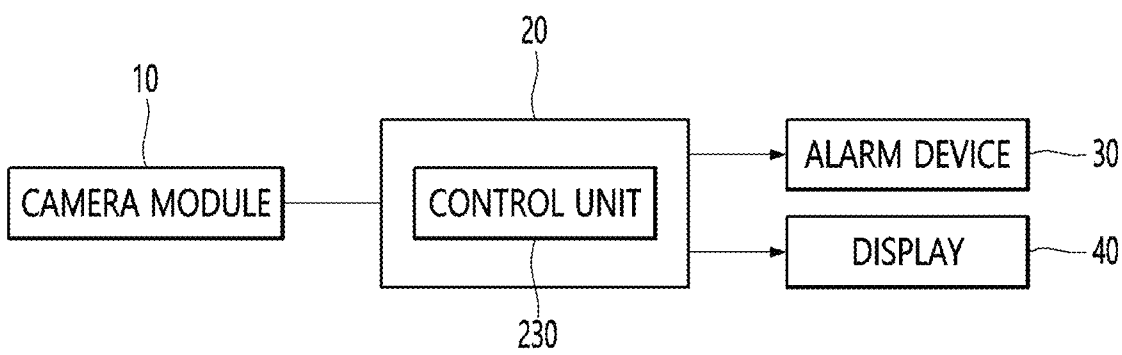
FIG. 6 is a simplified block diagram of a control unit of the electronic device and a module included in a vehicle according to exemplary embodiments of the present disclosure.

FIG. 6 is a simplified block diagram of the control unit 230 of the electronic device 20 and the modules included in the vehicle according to exemplary embodiments of the present disclosure.

Referring to FIG. 6, the vehicle may include a plurality of modules. For example, the vehicle may include an alarm device 30 and a display 40. Here, the vehicle may also include the camera module 10 among the plurality of modules. However, the present disclosure is not limited thereto.

The plurality of modules may be executed by the control unit 230 of the electronic device 20.

The alarm device 30 may receive alarm information from the control unit 230 of the electronic device 20. For example, the alarm device 30 may transmit alarm information to a user (e.g., a driver) along with an image using a buzzer, a speaker, an LED display, etc. Here, the alarm information may be risk information about an external object.

The display 40 may be used to display the corrected image from the electronic device 20. The control unit 230 of the electronic device 20 may transmit the corrected image to the display 40. The user (e.g., driver) may select and view the divided images according to the driving mode by touching the screen on the display 40.

Figure 7:
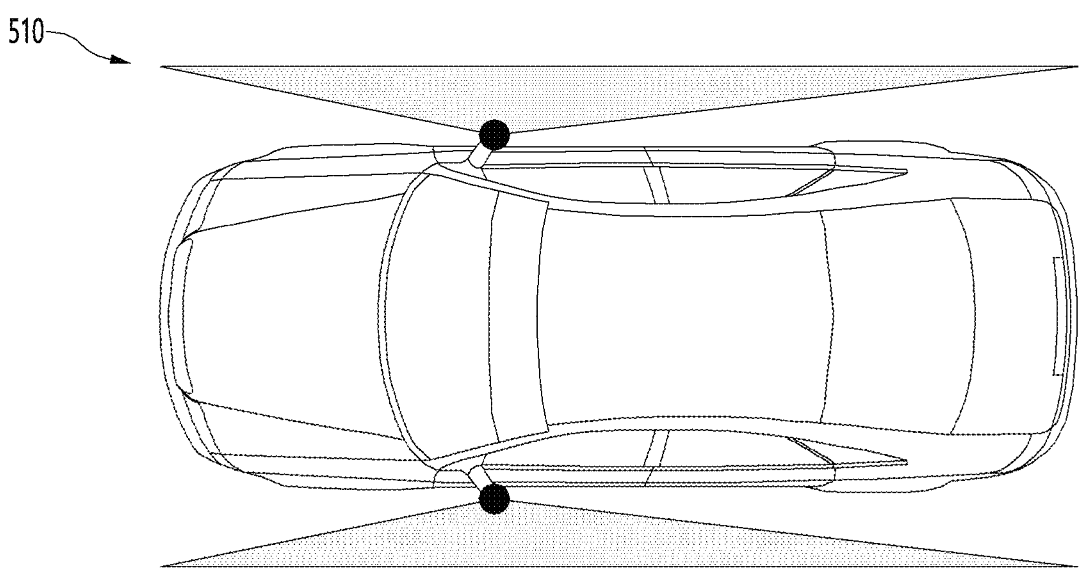
FIGS. 7 and 8 are diagrams illustrating an area captured by the camera equipped with the wide-angle lens according to exemplary embodiments of the present disclosure according to a driving mode.
Figure 8:
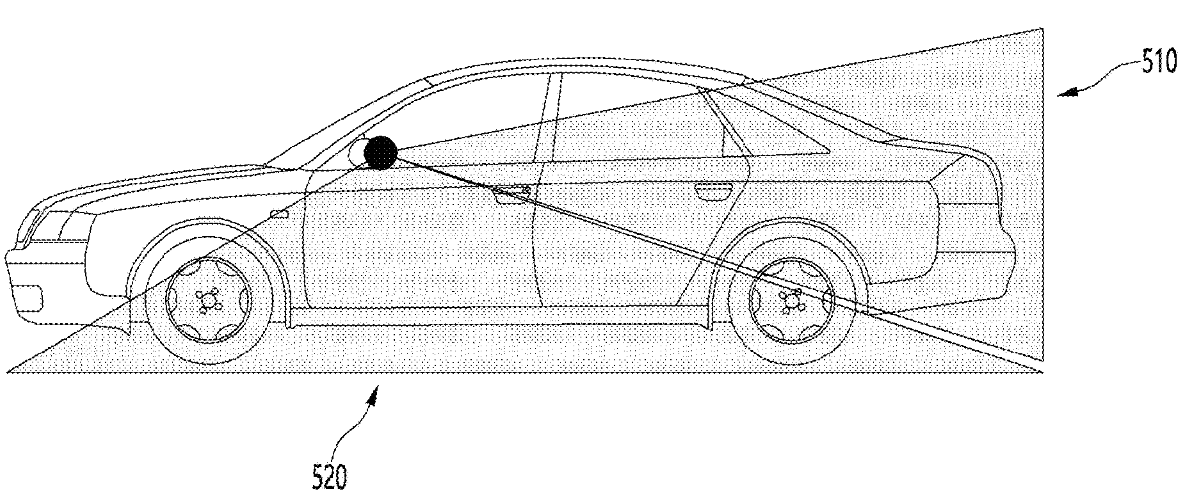

FIGS. 7 and 8 are diagrams illustrating an area captured by the camera equipped with the wide-angle lens according to exemplary embodiments of the present disclosure according to a driving mode.

The control unit 230 of the electronic device 20 may receive the information on the internal environment and the external environment of the vehicle from the sensor unit 260. When the sensor unit 260 detects the driving mode, the image conversion unit 240 may control the vehicle surrounding images, which are divided into the plurality of images according to the driving mode of the vehicle, to be selectively merged and corrected to a single flat image. The driving mode may include a forward mode 510, a backward mode 520, a left turn mode, and a right turn mode.

When the driving mode is the forward mode 510, the image conversion unit 240 may be controlled to merge the vehicle surrounding images captured by the first camera 110, the second camera 120, and the fourth camera 140, respectively, and correct the merged vehicle surrounding images to the single flat image so that the rear area of the vehicle may be confirmed through the control unit 60.

As an example, referring to FIGS. 7 and 8, when the vehicle is driving, the left and right sides may be confirmed through the images captured by the first and second cameras 110 and 120. In addition, when only the rear area of the vehicle is to be confirmed, the image conversion unit 240 may be controlled to merge the images of the left rear area, the rear area, and the right rear area and output the merged images as the single corrected image according to the user selection.

When the driving mode is the backward mode 520, the image conversion unit 240 may be controlled to merge and correct the vehicle surrounding images captured by the first camera 110, the second camera 120, and the fourth camera 140 to the single flat image so that the bottom area and the rear area of the left and right sides of the vehicle may be confirmed, but the left side area and the right side area may be controlled to extract only the bottom area and merge the vehicle surrounding images.

As an example, referring to FIG. 8, when the vehicle is parked or moving backward, the image conversion unit 240 may be controlled to merge the images of the bottom area and the rear area among the areas captured by the first and second cameras 110 and 120 and output the merged images as the single corrected image. In addition, when only the entire rear area of the vehicle is to be confirmed, the image conversion unit 240 may be controlled to merge the images of the left rear area, the rear area, and the right rear area and output the merged images as the single corrected image according to the user selection.

When the driving mode is the left turn mode, the image conversion unit 240 may be controlled to correct the vehicle surrounding images captured by the first camera 110 to the flat image so that the left area of the vehicle may be confirmed.

When the driving mode is the right turn mode, the image conversion unit 240 may be controlled to correct the vehicle surrounding images captured by the second camera 120 to the flat image so that the right area of the vehicle may be confirmed.

Figure 9:
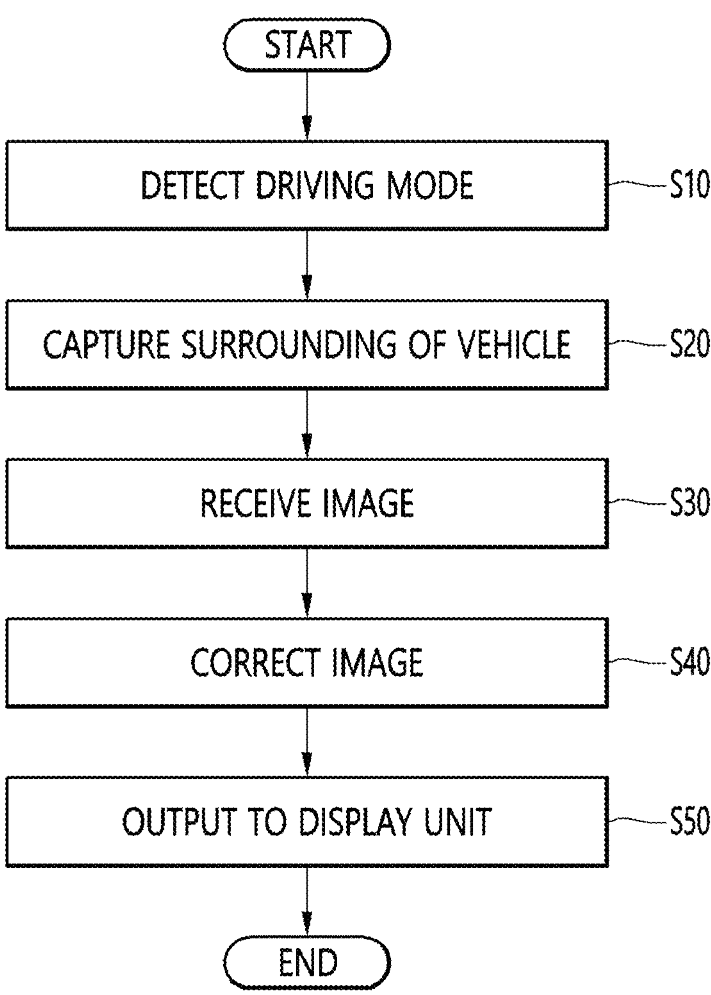
FIG. 9 is a flowchart illustrating an image processing method for capturing surroundings of a vehicle using a wide-angle lens according to exemplary embodiments of the present disclosure.

FIG. 9 is a flowchart illustrating an image processing method for capturing surroundings of a vehicle using a wide-angle lens according to exemplary embodiments of the present disclosure.

Referring to FIG. 9, the image processing method of capturing surroundings of a vehicle captured using a wide-angle lens may be performed as a driving mode detection step (S10), a vehicle surrounding capturing step (S20), an image reception step (S30), an image correction step (S40), and a display output step (S50).

The driving mode detection step (S10) may detect the forward mode 510, the backward mode 520, the left turn mode, and the right turn mode of the vehicle by the sensor unit 260, and the camera module 10 may be activated to capture an appropriate area according to each driving mode.

The vehicle surrounding capturing step (S20) may capture the surroundings of the vehicle using the camera module 10 equipped with the wide-angle lens. The forward mode 510 and the backward mode 520 may be captured by the first camera 110, the second camera 120, and the fourth camera 140, the left turn mode may be captured by the first camera 110, and the right turn mode may be captured by the second camera 120.

The image reception step (S30) may receive the captured vehicle surrounding images. The image input unit 20 may receive the overview screen in the circularly curved shape from the first and second cameras 110 and 120 equipped with the wide-angle lenses.

The image correction step (S40) may correct the received image according to the driving mode. The image conversion unit 240 may be controlled to divide the received vehicle surrounding images into the plurality of images, and then selectively merge some of the divided vehicle surrounding images and correct the merged vehicle surrounding images into the single flat image.

In an embodiment, when the driving mode is the forward mode 510, the images corresponding to the rear area among the images captured by the first and second cameras 110 and 120 and the image of the fourth camera 140 may be merged and corrected to the single flat image.

In another embodiment, when the driving mode is the backward mode 520, the image corresponding to the bottom area of the rear area among the images captured by the first and second cameras 110 and 120 and the images of the fourth camera 140 may be merged and corrected to the single flat image.

The display output step (S50) may output the corrected vehicle surrounding images to an LCD screen. The vehicle surrounding images may be output along with an alarm device such as a buzzer, a speaker, an LED indicator, and the image may be stored in a separate storage device.

As described above, referring to FIGS. 1 to 8, the image processing device 1 and method for capturing surroundings of a vehicle according to exemplary embodiments of the present disclosure may obtain economic effects by reducing the number of cameras, thereby reducing the weight and cost by capturing the surroundings of the vehicle at the wide angle of view using the camera equipped with the wide-angle lens and replacing the functions performed by the plurality of cameras.

According to the image processing device 1 and method for capturing surroundings of a vehicle according to exemplary embodiments of the present disclosure, it is possible to easily confirm the conditions of the surroundings of the vehicle by correcting the overview screen of the circularly curved shape, captured by the wide-angle lens, into the flat image and outputting the flat image.

According to the image processing device 1 and method for capturing surroundings of a vehicle according to exemplary embodiments of the present disclosure, it is possible to increase the convenience by dividing the captured image by area and correcting the captured image so that the area suitable for the driving mode is output.

According to the image processing device 1 and method for capturing surroundings of a vehicle according to exemplary embodiments of the present disclosure, it is possible to confirm the conditions of the surroundings of the vehicle using the wide angle of view of 360°, so that no blind spots occur, thereby increasing the surveillance function.

Hereinafter, an autonomous driving system, an autonomous vehicle, and a user device using various information, data, images, etc., collected through a driving video recording system according to the present disclosure will be described in more detail with reference to FIGS. 10 to 13.

Figure 10:
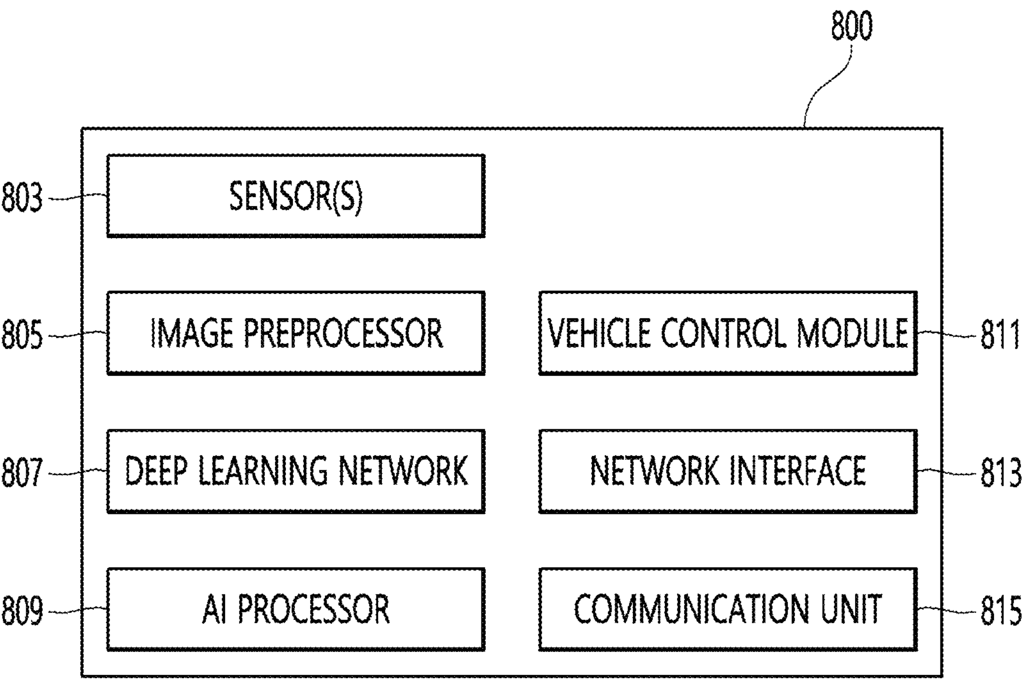
FIG. 10 is a diagram illustrating an example of a block diagram illustrating an autonomous driving system of a vehicle according to exemplary embodiments of the present disclosure.

FIG. 10 illustrates an example of a block diagram illustrating an autonomous driving system of a vehicle according to an embodiment.

Referring to FIG. 10, an autonomous driving system 800 of the vehicle may include a deep learning network including sensors 803, an image preprocessor 805, a deep learning network 807, an artificial intelligence (AI) processor 809, a vehicle control module 811, a network interface 813, and a communication unit 815. In various embodiments, the respective components may be connected to each other through various interfaces. For example, sensor data sensed and output by the sensors 803 may be fed to the image preprocessor 805. The sensor data processed by the image preprocessor 805 may be fed to the deep learning network 807 running on the AI processor 809. The output of the deep learning network 807 running on the AI processor 809 may be fed to the vehicle control module 811. The intermediate results of the deep learning network 807 running on the AI processor 809 may be fed to the AI processor 809. In various embodiments, the network interface 813 communicates with the electronic device in the vehicle to transmit autonomous driving path information and/or autonomous driving control commands for autonomous driving of the vehicle to internal block configurations. In an embodiment, the network interface 813 may be utilized to transmit the sensor data acquired via the sensor(s) 803 to an external server. In some embodiments, the autonomous driving control system 800 may include additional or fewer components as appropriate. For example, in some embodiments, the image preprocessor 805 is an optional component. As another example, a post-processing component (not illustrated) may be included within the autonomous driving control system 800 to perform the post-processing on the output of the deep learning network 807 before the output is provided to the vehicle control module 811.

In some embodiments, the sensors 803 may include one or more sensors. In various embodiments, the sensors 803 may be attached to different locations on the vehicle. The sensors 803 may face one or more different directions. For example, the sensors 803 may be directed to a front, sides, a rear, and/or a roof of the vehicle in directions such as forward-facing, rear-facing, side-facing, and the like. In some embodiments, the sensors 803 may be image sensors such as high dynamic range cameras. In some embodiments, the sensors 803 include non-visual sensors. In some embodiments, the sensors 803 include a radio detection and ranging (RADAR), a light detection and ranging (LiDAR), and/or an ultrasonic sensor in addition to the image sensors. In some embodiments, the sensors 803 are not mounted on a vehicle having the vehicle control module 811. For example, the sensors 803 may be included as a part of a deep learning system for capturing sensor data, and may be attached to an environment or a road and/or mounted on surrounding vehicles.

In some embodiments, the image pre-processor 805 is used to preprocess the sensor data of the sensors 803. For example, the image preprocessor 805 may be used to preprocess the sensor data, split the sensor data into one or more components, and/or post-process one or more components. In some embodiments, the image preprocessor 805 may be a graphics processing unit (GPU), a central processing unit (CPU), an image signal processor, or a specialized image processor. In various embodiments, the image preprocessor 805 may be a tone-mapper processor for processing high dynamic range data. In some embodiments, the image preprocessor 805 may be a component of the AI processor 809.

In some embodiments, the deep learning network 807 is a deep learning network for implementing control commands for controlling an autonomous vehicle. For example, the deep learning network 807 may be an artificial neural network, such as a convolutional neural network (CNN), trained using the sensor data, and the output of the deep learning network 807 is provided to the vehicle control module 811.

In some embodiments, the artificial intelligence (AI) processor 809 is a hardware processor for running the deep learning network 807. In some embodiments, the AI processor 809 is a specialized AI processor for performing inference using convolutional neural networks (CNNs) on the sensor data. In some embodiments, the AI processor 809 is optimized for a bit depth of the sensor data. In some embodiments, the AI processor 809 may be optimized for deep learning operations, such as operations of a neural network including convolution, inner product, vector, and/or matrix operations. In some embodiments, the AI processor 809 may be implemented using a plurality of graphic processing units (GPUs) that may effectively perform parallel processing.

In various embodiments, the AI processor 809 may be coupled via an input/output interface to a memory configured to provide the AI processor with instructions to perform the deep learning analysis on the sensor data received from the sensor(s) 803 while the AI processor 809 is running and to determine the machine learning results used to operate the vehicle at least partially autonomously. In some embodiments, the vehicle control module 811 may be used to process commands for vehicle control output from the artificial intelligence (AI) processor 809 and to translate an output of the AI processor 809 into instructions for controlling modules of each vehicle in order to control various modules of the vehicle. In some embodiments, the vehicle control module 811 is used to control a vehicle for autonomous driving. In some embodiments, the vehicle control module 811 may adjust steering and/or speed of the vehicle. For example, the vehicle control module 811 may be used to control driving of the vehicle, such as deceleration, acceleration, steering, lane marking change, and lane marking maintenance. In some embodiments, the vehicle control module 811 may generate control signals for controlling vehicle lighting, such as brake lights, turns signals, and headlights. In some embodiments, the vehicle control module 811 may be used to control vehicle audio related systems such as a vehicle's sound system, vehicle's audio warnings, a vehicle's microphone system, and a vehicle's horn system.

In some embodiments, the vehicle control module 811 may be used to control notification systems including warning systems for notifying passengers and/or driver of driving events, such as an approach to an intended destination or a potential collision. In some embodiments, the vehicle control module 811 may be used to adjust sensors, such as sensors 803 of the vehicle. For example, the vehicle control module 811 may modify the orientation of the sensors 803, change output resolution and/or a format type of the sensors 803, increase or decrease a capture rate, adjust a dynamic range, and adjust a focus of a camera. In addition, the vehicle control module 811 may individually or collectively turn on/off operations of the sensors.

In some embodiments, the vehicle control module 811 may be used to change parameters of the image preprocessor 805 in a manner such as a manner of modifying frequency ranges of filters, adjusting features and/or edge detection parameters for object detection, or adjusting channels and bit depth. In various embodiments, the vehicle control module 811 may be used to control autonomous driving of the vehicle and/or a driver assistance function of the vehicle.

In some embodiments, the network interface 813 may be in charge of an internal interface between block components of the autonomous driving system 800 and the communication unit 815. Specifically, the network interface 813 may be a communication interface for receiving and/or transmitting data including voice data. In various embodiments, the network interface 813 may be connected to external servers in order to connect voice calls, receive and/or sends text messages, transmit the sensor data, updates software of the vehicle with the autonomous driving system, or to update software of the autonomous driving system of the vehicle through the communication unit 815.

In various embodiments, the communication unit 815 may include various wireless interfaces in a cellular or WiFi manner. For example, the network interface 813 may be used to receive an update for operating parameters and/or instructions for the sensors 803, the image preprocessor 805, the deep learning network 807, the AI processor 809, and the vehicle control module 811 from servers connected through the communication unit 815. For example, a machine learning model of the deep learning network 807 may be updated using the communication unit 815. According to another example, the communication unit 815 may be used to update operating parameters of the image preprocessor 805 such as image processing parameters and/or firmware of the sensors 803.

In another embodiment, the communication unit 815 may be used to activate communication for emergency services and emergency contact in an accident or a near-accident event. For example, in a crash event, the communication unit 815 may be used to call emergency services for assistance, and may notify the outside of emergency services of crash details and a location of the vehicle. In various embodiments, the communication unit 815 may update or obtain an expected arrival time and/or a destination location.

According to an embodiment, the autonomous driving system 800 illustrated in FIG. 10 may be configured as the electronic device in the vehicle. According to an embodiment, the AI processor 809 of the autonomous driving system 800 may be controlled to train the autonomous driving software of the vehicle by controlling to input autonomous driving disengagement event-related information as training set data of the deep learning network when an autonomous driving disengagement event occurs from a user during the autonomous driving of the vehicle.

Figure 12:
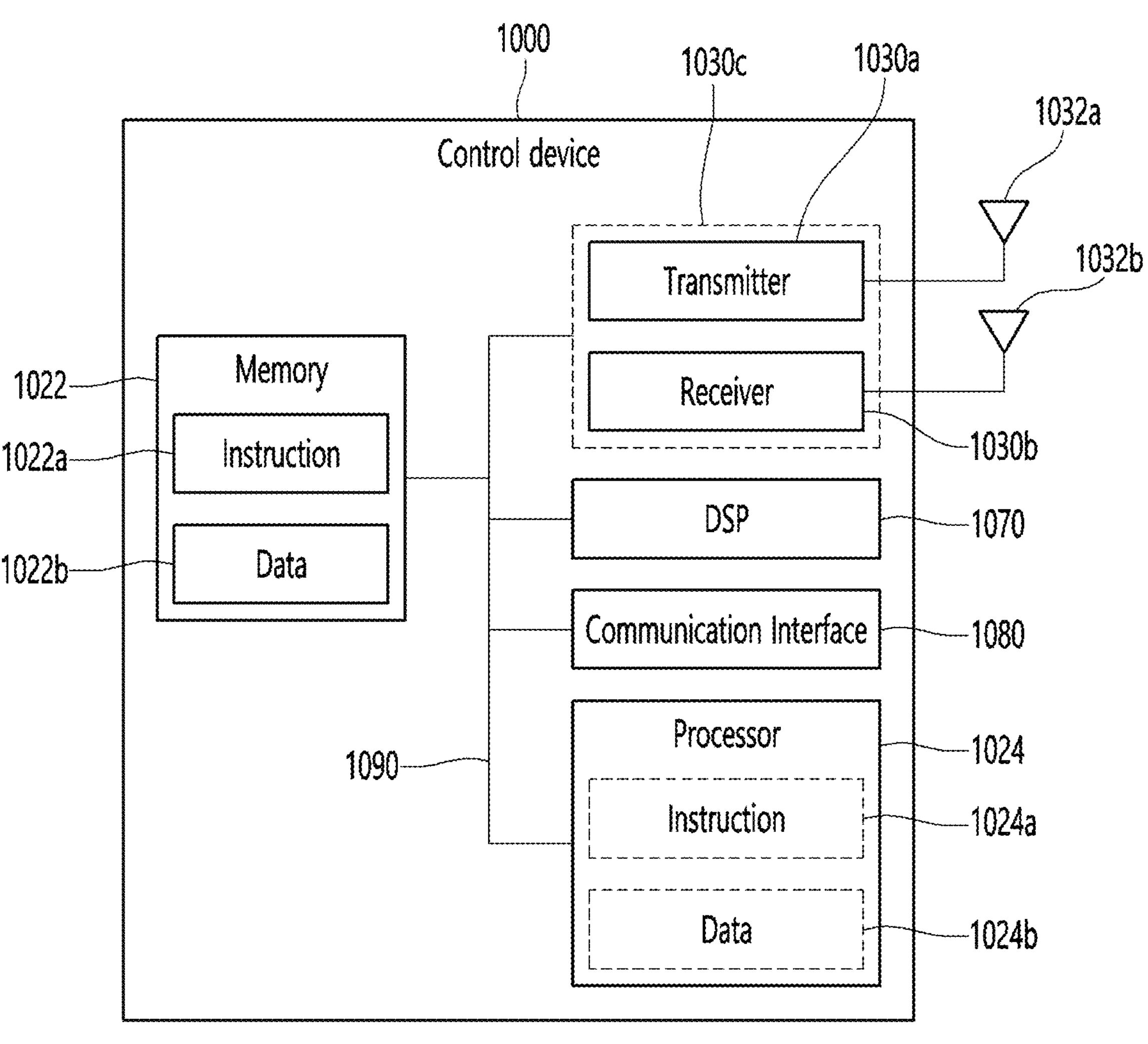

FIGS. 11 and 12 are examples of block diagrams illustrating an autonomous driving moving body according to an embodiment. Referring to FIG. 11, an autonomous driving moving body 900 according to the present embodiment may include a control device 1000, sensing modules 904*a*, 904*b*, 904*c*, and 904*d*, an engine 906, and a user interface 908.

The autonomous driving moving body 900 may include an autonomous driving mode or a manual mode. For example, the manual mode may be switched to an autonomous driving mode or the autonomous driving mode may be switched to a manual mode according to a user input received through the user interface 908.

When the moving body 900 operates in the autonomous driving mode, the autonomous driving moving body 900 may operate under the control of the control device 1000.

In the present embodiment, the control device 1000 may include a controller 1020 including a memory 1022 and a processor 1024, a sensor 1010, a communication device 1030, and an object detection device 1040.

Here, the object detection device 1040 may perform all or part of the functions of the distance measuring device (e.g., the electronic device 101).

That is, in the present embodiment, the object detection device 1040 is a device for detecting an object located outside the moving body 900, and the object detection device 1040 may detect an object located outside the moving body 900 and generate object information according to the detection result.

The object information may include information on existence or absence of an object, position information of the object, distance information between the moving body and the object, and relative speed information between the moving body and the object.

The object may include various objects located outside the moving body 900, such as lane marking, other vehicles, pedestrians, traffic signals, lights, roads, structures, speed bumps, terrain, and animals. Here, the traffic signal may include a concept including traffic lights, traffic signs, and patterns or texts drawn on the road surface. In addition, light may be light generated from a lamp equipped on another vehicle, light generated from a streetlight, or sunlight.

In addition, the structure may be an object located around a road and fixed to the ground. For example, the structure may include streetlights, street trees, buildings, utility poles, traffic lights, and bridges. Terrain may include mountains, hills, and the like.

The object detection device 1040 may include a camera module. The controller 1020 may extract object information from the external image photographed by the camera module and process information on the object information.

In addition, the object detection device 1040 may further include imaging devices for recognizing the external environment. In addition to LIDAR, RADAR, GPS device, odometry, and other computer vision devices, ultrasonic sensors, and infrared sensors may be used, and these devices may be selectively or simultaneously operated as needed to enable more precise detection.

Meanwhile, the distance measuring device according to an embodiment of the present disclosure may calculate a distance between the autonomous driving moving body 900 and the object, and may control the operation of the moving body based on the calculated distance in conjunction with the control device 1000 of the autonomous driving moving body 900.

For example, when there is a possibility of collision depending on the distance between the autonomous driving moving body 900 and the object, the autonomous driving moving body 900 may control brakes to slow down or stop. As another example, when the object is a moving object, the autonomous driving moving body 900 may control the driving speed of the autonomous driving moving body 900 to maintain a predetermined distance or more from the object.

The distance measuring device according to an embodiment of the present disclosure may be configured as a module within the control device 1000 of the autonomous driving moving body 900. That is, the memory 1022 and the processor 1024 of the control device 1000 may be configured to implement the collision prevention method according to the present disclosure in software.

In addition, the sensor 1010 may be connected to the moving body internal/external environment sensing modules 904*a*, 904*b*, 904*c*, and 904*d* to obtain various sensing information. Here, the sensor 1010 may include a posture sensor (e.g., a yaw sensor, a roll sensor, a pitch sensor, a collision sensor, a wheel sensor, a speed sensor, an inclination sensor, a weight detection sensor, a heading sensor, a gyro sensor, a position module, a moving body forward/backward sensor, a battery sensor, a fuel sensor, a tire sensor, a steering sensor by steering wheel rotation, a moving body internal temperature sensor, a moving body internal humidity sensor, an ultrasonic sensor, an illuminance sensor, an accelerator pedal position sensor, a brake pedal position sensor, etc.).

Accordingly, the sensor 1010 may acquire sensing signals such as moving body posture information, moving body collision information, moving body direction information, moving body position information (GPS information), moving body angle information, moving body speed information, moving body acceleration information, moving body inclination information, moving body forward/backward information, battery information, fuel information, tire information, moving body lamp information, moving body internal temperature information, moving body internal humidity information, steering wheel rotation angle, moving body external illuminance, acceleration, pressure applied to an accelerator pedal, pressure applied to a brake pedal, etc.

In addition, the sensor 1010 may further include an accelerator pedal sensor, a pressure sensor, an engine speed sensor, an air flow sensor (AFS), an intake temperature sensor (ATS), a water temperature sensor (WTS), a throttle position sensor (TPS), a TDC sensor, a crank angle sensor (CAS), etc.

In this way, the sensor 1010 may generate moving body state information based on the sensing data.

The wireless communication device 1030 is configured to implement wireless communication between the autonomous driving moving bodies 900. For example, the autonomous driving moving body 900 may communicate with a user's mobile phone or other wireless communication device 1030, another moving body, a central device (traffic control device), a server, and the like. The wireless communication device 1030 may transmit and receive a wireless signal according to an access wireless protocol. The wireless communication protocol may be Wi-Fi, Bluetooth, long-term evolution (LTE), code division multiple access (CDMA), wideband code division multiple access (WCDMA), global systems for mobile communications (GSM), and the communication protocols are not limited thereto.

In addition, in the present embodiment, the autonomous driving moving body 900 can also implement communication between the moving bodies through the wireless communication device 1030. That is, the wireless communication device 1030 may communicate with other moving bodies on the road through vehicle-to-vehicle communication. The autonomous driving moving body 900 may transmit and receive information such as driving warnings and traffic information through vehicle-to-vehicle communication, and may also request information or receive requests from other moving bodies. For example, the wireless communication device 1030 may perform V2V communication as a dedicated short-range communication (DSRC) device or a cell-V2V (C-V2V) device. In addition to the inter-vehicle communication, vehicle to everything communication (V2X) between the vehicle and other objects (for example, an electronic device carried by a pedestrian) may be implemented through the wireless communication device 1030.

In this embodiment, the controller 1020 is a unit that controls the overall operation of each unit within the moving body 900, and may be configured by the manufacturer of the moving body during manufacturing or may be additionally configured after manufacturing to perform the function of autonomous driving. Alternatively, a configuration for performing continuous additional functions may be included through an upgrade of the controller 1020 configured at the time of manufacturing. Such a controller 1020 may also be called an electronic control unit (ECU).

The controller 1020 may collect various data from the connected sensors 1010, the object detection device 1040, the communication device 1030, etc., and transmit control signals to other components within the moving body, such as the sensor 1010, the engine 906, the user interface 908, the communication device 1030, and the object detection device 1040, based on the collected data. In addition, although not illustrated, the control signals may also be transmitted to the acceleration device, the braking system, the steering device, or the navigation device related to the driving of the moving body.

In this embodiment, the controller 1020 may control the engine 906, and for example, may detect the speed limit of the road on which the autonomous driving moving body 900 is driving and control the engine 906 so that the driving speed does not exceed the speed limit, or control the engine 906 so that the driving speed of the autonomous driving moving body 900 is accelerated within the range that does not exceed the speed limit.

In addition, when the autonomous driving moving body 900 is approaching or departing from lane marking while the autonomous driving moving body 900 is driving, the controller 1020 may determine whether such approaching or departing from the lane marking is due to a normal driving situation or due to other driving situations, and control the engine 906 to control the driving of the moving body based on the determination result. Specifically, the autonomous driving moving body 900 may detect lane marking formed on both sides of a road on which the moving body is driving. In this case, the controller 1020 determines whether the autonomous driving moving body 900 is approaching or departing from the lane marking, and when it is determined that the autonomous driving moving body 900 is approaching or departing from the lane marking, it may determine whether such driving is due to a precise driving situation or due to another driving situation. Here, as an example of the normal driving situation, it may be a situation where the road change of the moving body is required. As an example of another driving situation, it may be a situation where the road change of the moving body is not required. When the controller 1020 determines that the autonomous driving moving body 900 is approaching or departing from the lane marking in a situation where the road change of the moving body is not required, it may control the driving of the autonomous driving moving body 900 so that the autonomous driving moving body 900 does not depart from the lane marking and drives normally in the moving body.

When there is another moving body or an obstacle in front of the moving body, the engine 906 or the braking system may be controlled to decelerate the moving body, and in addition to the speed, the trajectory, the driving path, and the steering angle may be controlled. Alternatively, the controller 1020 may generate a necessary control signal according to recognition information of a traveling lane marking, a traveling signal, or other external environment of the moving body to control the traveling of the moving body.

In addition to generating its own control signal, the controller 1020 can control the traveling of the moving body by performing communication with the surrounding moving body or the central server and transmitting a command for controlling the peripheral apparatuses through the received information.

In addition, the controller 1020 may generate a control signal to control calibration of the camera module 1050 to inhibit the difficulty in accurate moving body or lane marking recognition according to the present embodiment when the position or angle of view of the camera module 1050 changes. Therefore, in the present embodiment, the controller 1020 may generate a calibration control signal to the camera module 1050, so even if the mounting position of the camera module 1050 changes due to the vibration or impact generated according to the movement of the autonomous driving moving body 900, the normal mounting position, direction, angle of view, etc., of the camera module 1050 may be continuously maintained. The controller 1020 may generate the control signal to perform the calibration of the camera module 1020 when initial mounting position, direction, angle of view information, etc., of the camera module 1020 stored in advance and initial mounting position, direction, angle of view information, etc., of the camera module 1020 measured while the autonomous driving moving body 900 is driving vary by more than a threshold value.

In the present embodiment, the controller 1020 may include the memory 1022 and the processor 1024. The processor 1024 may execute software stored in the memory 1022 according to the control signal of the controller 1020. Specifically, the controller 1020 may store data and commands for performing a lane marking detection method according to the present disclosure in the memory 1022, and the commands may be executed by the processor 1024 to implement one or more of the methods disclosed herein.

In this case, the memory 1022 may be stored in a recording medium executable by the nonvolatile processor 1024. The memory 1022 may store software and data through appropriate internal and external devices. The memory 1022 may include a random access memory (RAM), a read only memory (ROM), a hard disk, and a memory 1022 device connected to a dongle.

The memory 1022 may store at least an operating system (OS), a user application, and executable instructions. The memory 1022 may also store application data and array data structures.

The processor 1024 may be a controller, microcontroller, or state machine as a microprocessor or a suitable electronic processor.

The processor 1024 may be implemented in a combination of computing devices, and the computing device may be a digital signal processor, a microprocessor, or an appropriate combination thereof.

Meanwhile, the autonomous driving moving body 900 may further include the user interface 908 for user input to the control device 1000 described above. The user interface 908 may allow a user to input information with appropriate interactions. For example, the user interface may be implemented as a touch screen, a keypad, an operation button, or the like. The user interface 908 may transmit an input or a command to the controller 1020, and the controller 1020 may perform a control operation of the moving body in response to the input or command.

In addition, the user interface 908 may be configured to communicate with the autonomous driving moving body 900 via the wireless communication device 1030, which is an external device of the autonomous driving moving body 900. For example, the user interface 908 may be interoperable with a mobile phone, a tablet, or other computer devices.

Furthermore, in this embodiment, although the autonomous driving moving body 900 is described as including the engine 906, it may also include other types of propulsion systems. For example, the moving body may be driven by electrical energy and may be operated by hydrogen energy or a hybrid system combining them. Accordingly, the controller 1020 may include a propulsion mechanism according to the propulsion system of the moving body autonomous driving moving body 900, and may provide the control signal to components of each propulsion mechanism.

Hereinafter, with reference to FIG. 12, the detailed configuration of the control device 1000 according to the present disclosure will be described in more detail.

The control device 1000 includes the processor 1024. The processor 1024 may be a general purpose single or multichip microprocessor, a dedicated microprocessor, a microcontroller, a programmable gate array, or the like. The processor may be referred to as a central processing unit (CPU). In addition, in the present embodiment, the processor 1024 may be used as a combination of a plurality of processors.

The control device 1000 also includes the memory 1022. The memory 1022 may be any electronic component capable of storing electronic information. The memory 1022 may also be a combination of memories 1022 in addition to a single memory.

Data and instructions 1022*a* for performing the distance measuring method of the distance measuring device according to the present disclosure may be stored in the memory 1022. When the processor 1024 executes the instructions 1022*a*, all or part of the instructions 1022*a* and data 1022*b* required for executing the instructions may be loaded (1024*a* and 1024*b*) onto the processor 1024.

The control device 1000 may include a transmitter 1030*a*, a receiver 1030*b*, or a transceiver 1030*c* to allow transmission and reception of signals. One or more antennas 1032*a* and 1032*b* may be electrically connected to a transmitter 1030*a*, a receiver 1030*b*, or each transceiver 1030*c* and may further include antennas.

The control device 1000 may include a digital signal processor (DSP) 1070. The DSP 1070 enables a moving body to process digital signals quickly.

The control device 1000 may include a communication interface 1080. The communication interface 1080 may include one or more ports and/or communication modules for connecting other devices to the control device 1000. The communication interface 1080 may enable the user and the control device 1000 to interact.

Various configurations of the control device 1000 may be connected together by one or more buses 1090, and the buses 1090 may include a power bus, a control signal bus, a status signal bus, a data bus, and the like. Under the control of the processor 1024, the components may transmit information to each other through the bus 1090 and perform a desired function.

Meanwhile, in various embodiments, the control device 1000 may be associated with a gateway for communicating with a secure cloud. For example, referring to FIG. 13, the control device 1000 may be associated with a gateway 1105 for providing information obtained from at least one of the components 1101 to 1104 of the vehicle 1100 to a security cloud 1106. For example, the gateway 1105 may be included within the control device 1000. In another example, the gateway 1105 may be configured as a separate device within the vehicle 1100, distinct from the control device 1000. The gateway 1105 is communicatively connected to the network within the vehicle 1100 secured by a software management cloud 1109, a security cloud 1106, and the in-car security software 1110, which have different networks.

For example, the component 1101 may be a sensor. For example, the sensor may be utilized to obtain information on at least one of the state of the vehicle 1100 or the state of the surroundings of the vehicle 1100. For example, the component 1101 may include sensor 1410.

For example, the component 1102 may be electronic control units (ECUs). For example, the ECUs may be used for engine control, transmission control, airbag control, and tire pressure management.

For example, the component 1103 may be an instrument cluster. For example, the instrument cluster may mean a panel located in front of the driver's seat among the dashboard. For example, the instrument cluster may be configured to show information necessary for driving to a driver (or passenger). For example, the instrument cluster may be used to display at least one of visual elements for indicating engine revolutions per minute (RPM) (or rotates per minute), visual elements for indicating speed of the vehicle 1100, visual elements for indicating remaining fuel level, visual elements for indicating gear state, or visual elements for indicating information obtained via component 1101.

For example, the component 1104 may be a telematics device. For example, the telematics device may mean a device that provides various mobile communication services, such as location information and safe driving, within the vehicle 1100 by combining a wireless communication technology and a global positioning system (GPS) technology. For example, the telematics device may be used to connect the vehicle 1100 to a driver, a cloud (e.g., a security cloud 1106), and/or the surrounding environment. For example, the telematics device may be configured to support high bandwidth and low latency for a technology of the 5G NR standard (e.g., V2X technology of 5G NR). For example, the telematics device may be configured to support the autonomous driving of the vehicle 1100.

For example, the gateway 1105 may be used to connect a network within the vehicle 1100 to an external network, such as the software management cloud 1109 and the security cloud 1106. For example, the software management cloud 1109 may be used to update or manage at least one software required for driving and managing the vehicle 1100. For example, the software management cloud 1109 may be linked to in-car security software (in-car security software) 1110 installed in the vehicle. For example, the in-car security software 1110 may be used to provide a security function within the vehicle 1100. For example, the in-car security software 1110 may encrypt data transmitted and received through the in-car network using an encryption key obtained from an external authorized server for encryption of the in-car network. In various embodiments, the encryption key used by the in-car security software 1110 may be generated in response to the identification information (vehicle license plate, vehicle identification number (VIN)) of the vehicle or information uniquely assigned to each user (e.g., user identification information).

In various embodiments, the gateway 1105 may transmit data encrypted by the in-car security software 1110 based on the encryption key to the software management cloud 1109 and/or the security cloud 1106. The software management cloud 1109 and/or the security cloud 1106 can identify which vehicle or which user the data was received from by decrypting the data encrypted by the encryption key of the in-car security software 1110 using the decryption key that may decrypt the data. For example, since the decryption key is a unique key corresponding to the encryption key, the software management cloud 1109 and/or the security cloud 1106 may identify the transmitting entity (e.g., the vehicle or the user) of the data based on the data decrypted by the decryption key.

For example, the gateway 1105 may be configured to support the in-car security software 1110 and may be associated with the control device 1000. For example, the gateway 1105 may be associated with the control device 1000 to support the connection between a client device 1107 connected to the security cloud 1106 and the control device 1000. In another example, the gateway 1105 may be associated with the control device 1000 to support a connection between a third-party cloud 1108 connected to the security cloud 1106 and the control device 1000. However, the present disclosure is not limited thereto.

In various embodiments, the gateway 1105 may be utilized to connect the vehicle 1100 to a software management cloud 1109 for managing the operating software of the vehicle 1100. For example, the software management cloud 1109 may monitor whether the update of the operating software of the vehicle 1100 is required, and may provide data for updating the operating software of the vehicle 1100 via the gateway 1105 based on monitoring that the update of the operating software of the vehicle 1100 is required. As another example, the software management cloud 1109 may receive a user request requesting the update of the operating software of the vehicle 1100 from the vehicle 1100 through the gateway 1105, and provide data for updating the operating software of the vehicle 1100 based on the reception. However, the present disclosure is not limited thereto.

Meanwhile, the methods according to various exemplary embodiments of the present disclosure described above may be implemented as programs and be provided to servers or devices. Therefore, the respective devices may access the servers or the devices in which the programs are stored to download the programs.

In addition, the methods according to various exemplary embodiments of the present disclosure described above may be implemented as programs and be provided in a state in which it is stored in various non-transitory computer-readable media. The non-transitory computer readable medium is not a medium that stores data for a while, such as a register, a cache, a memory, or the like, but means a medium that semi-permanently stores data and is readable by an apparatus. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

However, the concept of the present disclosure is not necessarily limited thereto, and the device/method/system according to exemplary embodiments of the present disclosure can be applied to various products/technology fields in addition to the products/technology fields described above.

Although various embodiments of the present disclosure have been disclosed for illustrative purposes, those skilled in the art will appreciate that various modifications, additions and substitutions are possible, without departing from the scope and spirit of the invention as disclosed in the accompanying claims. Accordingly, the scope of the present disclosure is not construed as being limited to the described embodiments but is defined by the appended claims as well as equivalents thereto.

DESCRIPTION OF REFERENCE NUMERALS IN THE DRAWINGS

| | |
|---|---|
| 1: image processing device | |
| 10: camera module | 20: electronic device |
| 30: alarm device | 40: display |
| 110: first camera | 120: second camera |
| 130: third camera | 140: fourth camera |
| 210: communication circuit | 220: image input unit |
| 230: control unit | 240: image conversion unit |
| 250: memory | 260: sensor unit |

The invention claimed is:

1. An image processing device for capturing surroundings of a vehicle, comprising:
- a camera module that is installed in the vehicle and includes a plurality of cameras equipped with wide-angle lenses,
  - wherein the plurality of cameras include:
    - a first camera installed on a left side mirror of the vehicle;
    - a second camera installed on a right side mirror of the vehicle;
    - a third camera configured to capture a front area of the vehicle; and
    - a fourth camera configured to capture a rear area of the vehicle; and
- an electronic device that processes an image acquired through the camera module,
  - wherein the electronic device includes:
    - a communication circuit;
    - an image input unit that receives captured vehicle surrounding images through the communication circuit;
    - an image conversion unit that corrects the vehicle surrounding images received by the image input unit; and
    - a control unit that controls the communication circuit, the image input unit, and the image conversion unit,
  - wherein the image conversion unit is controlled through the control unit so that an overview screen in a circularly curved shape captured by the camera module is corrected into a flat image,
  - wherein the image conversion unit is controlled through the control unit to divide the received vehicle surrounding images into a plurality of images according to a captured area of the vehicle,
  - wherein the vehicle surrounding images are divided into a front area, a rear area, a left side area, and a right side area of the vehicle based on mounting points of the wide-angle lenses installed on the side mirrors of the vehicle,
  - wherein the left side area and the right side area are further divided into a top area and a bottom area, respectively, in accordance with positions of the left side mirror and the right side mirror,
  - wherein the top area and the bottom area of each of the left side area and the right side area are defined based on a vertical reference axis passing through a corresponding side mirror mounting point and a horizontal reference plane corresponding to a side mirror mounting height,
  - wherein the top area corresponds to an image region above the horizontal reference plane, and
  - wherein the bottom area corresponds to an image region below the horizontal reference plane.

2. The image processing device of claim 1, wherein the image conversion unit is controlled to correct some of the plurality of divided vehicle surrounding images to the flat image.

3. The image processing device of claim 1, wherein the image conversion unit is controlled to selectively merge some of the plurality of divided vehicle surrounding images and correct the merged vehicle surrounding images to a single flat image.

4. The image processing device of claim 3, further comprising:
- a sensor unit that detects internal and external environments of the vehicle,
- wherein the sensor unit is controlled by the control unit to detect a driving mode of the vehicle.

5. The image processing device of claim 4, wherein the driving mode includes a forward mode, a backward mode, a left turn mode, and a right turn mode.

6. The image processing device of claim 5, wherein the image conversion unit is controlled to selectively merge some of the vehicle surrounding images divided into the plurality of images according to the driving mode of the vehicle and correct the merged vehicle surrounding images into the single flat image.

7. The image processing device of claim 6, wherein when the driving mode is the forward mode, the image conversion unit is controlled by the control unit to merge the vehicle surrounding images captured by each of the first camera, the second camera, and the fourth camera and correct the merged vehicle surrounding images to the single flat image.

8. The image processing device of claim 6, wherein when the driving mode is the backward mode, the image conversion unit is controlled to merge the vehicle surrounding images captured by each of the first camera, the second camera, and the fourth camera and correct the merged vehicle surrounding images to the single flat image, but the left side area and the right side area are each controlled to be extracted only from a bottom area and merge the vehicle surrounding images.

9. The image processing device of claim 6, wherein when the driving mode is the left turn mode, the image conversion unit is controlled to correct the vehicle surrounding images captured by the first camera to the single flat image.

10. The image processing device of claim 6, wherein when the driving mode is the right turn mode, the image conversion unit is controlled to correct the vehicle surrounding images captured by the second camera to the single flat image.

11. An image processing method of capturing surroundings of a vehicle, comprising:
- detecting a driving mode of the vehicle;
- capturing the surroundings of the vehicle using a camera module that is installed in the vehicle and includes a plurality of cameras equipped with a-wide-angle lenses;
- receiving the captured vehicle surrounding images;
- correcting the received vehicle surrounding images; and outputting the corrected vehicle surrounding images, wherein the corrected vehicle surrounding images are a video or an image in which an overview screen in a circularly curved shape is corrected to a flat image, wherein the plurality of cameras include a first camera installed on a left side mirror of the vehicle, a second camera installed on a right side mirror of the vehicle, a third camera configured to capture a front area of the vehicle, and a fourth camera configured to capture a rear area of the vehicle, wherein in the correcting, the received vehicle surrounding images are divided into a plurality of images according to a captured area of the vehicle under control of a control unit, wherein the vehicle surrounding images are divided into a front area, a rear area, a left side area, and a right side area of the vehicle based on mounting points of the wide-angle lenses installed on the side mirrors of the vehicle, wherein the left side area and the right side area are further divided into a top area and a bottom area, respectively, in accordance with positions of the left side mirror and the right side mirror, wherein the top area and the bottom area of each of the left side area and the right side area are defined based on a vertical reference axis passing through a corresponding side mirror mounting point and a horizontal reference plane corresponding to a side mirror mounting height, wherein the top area corresponds to an image region above the horizontal reference plane, and wherein the bottom area corresponds to an image region below the horizontal reference plane.

12. The image processing method of claim 11, wherein the captured vehicle surrounding images include images captured by the first camera, the second camera, the third camera, and the fourth camera, respectively.

13. The image processing method of claim 12, wherein in the correcting, after the received vehicle surrounding images are divided into a plurality of images according to the driving mode of the vehicle, some of the plurality of divided vehicle surrounding images are controlled to be selectively merged and corrected to a single flat image.

14. The image processing method of claim 12, wherein when the driving mode is a forward mode, in the correcting, the vehicle surrounding images captured by each of the first camera, the second camera, and the fourth camera are controlled to be merged and corrected to a single flat image.

15. The image processing method of claim 12, wherein when the driving mode is a backward mode, in the correcting, the vehicle surrounding images captured by the first camera, the second camera, and the fourth camera, respectively, are merged and corrected to a single flat image, but the images captured by the first and second cameras are merged by selectively extracting only a bottom area.

16. The image processing method of claim 12, wherein in the correcting, the images captured by the first to fourth cameras are controlled to be merged and corrected to a single flat image based on a user-selected image.

17. A non-transitory computer-readable recording medium in which a program for executing the image processing method of capturing surroundings of a vehicle according to claim 11 is recorded.

* * * * *